United States Patent
Pothos et al.

(10) Patent No.: US 7,210,119 B2
(45) Date of Patent: Apr. 24, 2007

(54) HANDLING UNSCHEDULED TASKS IN A SCHEDULING PROCESS

(75) Inventors: Dionisios Pothos, London (GB); Robert N W Laithwaite, Ipswich (GB); Ian S Alletson, Rochdale (GB)

(73) Assignee: @Road, Ltd., Suffolk (GB)

( * ) Notice: Subject to any disclaimer, the term of this patent is extended or adjusted under 35 U.S.C. 154(b) by 477 days.

(21) Appl. No.: 10/239,087

(22) PCT Filed: Mar. 1, 2001

(86) PCT No.: PCT/GB01/00874

§ 371 (c)(1), (2), (4) Date: Sep. 19, 2002

(87) PCT Pub. No.: WO01/75701

PCT Pub. Date: Oct. 11, 2001

(65) Prior Publication Data

US 2003/0041087 A1    Feb. 27, 2003

(30) Foreign Application Priority Data

Mar. 31, 2000   (EP) ................................. 00302758

(51) Int. Cl.
*G06F 9/44*       (2006.01)
*G06F 9/46*       (2006.01)
*G05B 19/418*     (2006.01)

(52) U.S. Cl. ............................ 717/102; 718/102; 705/8

(58) Field of Classification Search ........ 717/101–106; 705/7–9; 718/100; 709/229; 708/102

See application file for complete search history.

(56) References Cited

U.S. PATENT DOCUMENTS

| 4,852,001 | A |   | 7/1989 | Tsushima et al. |   |
|---|---|---|---|---|---|
| 5,408,663 | A |   | 4/1995 | Miller |   |
| 5,615,121 | A | * | 3/1997 | Babayev et al. | 705/9 |

(Continued)

FOREIGN PATENT DOCUMENTS

WO    WO 98/22897    5/1998

OTHER PUBLICATIONS

Parrott et al., "Comparing the WMS real time algorithm with AIP predictive schedulers", BT Technology Journal, vol. 13, No. 1, Jan. 1995, pp. 110-120.

*Primary Examiner*—Ted T. Vo
*Assistant Examiner*—Chih-Ching Chow
(74) *Attorney, Agent, or Firm*—Nixon & Vanderhye PC

(57) ABSTRACT

Tasks (T) such as repair jobs on a telecommunications system, that are to be performed by a plurality of resources such as field engineers (E), at different locations in a geographical area (2), are scheduled by means of a scheduler (10) at a work manager server (5). The scheduler provides schedule data (11) corresponding to schedules of the tasks that individual ones of the resources are to carry out, from task data (4) concerning the tasks to be carried out and resource data (6) concerning characteristics of resources available to carry out the tasks over a given period. Not all the tasks are scheduled, resulting in unscheduled task data (11a). The schedule data (11) is downloaded to a workstation (7) together with the unscheduled task data. The downloaded data is analysed at the workstation to determine a candidate resource (E) to perform the task (T) corresponding to the unscheduled task data.

13 Claims, 18 Drawing Sheets

U.S. PATENT DOCUMENTS 5,826,236 A    10/1998   Narimatsu et al.
5,890,134 A     3/1999   Fox
6,578,005 B1 *  6/2003   Lesaint et al. .................. 705/8
2003/0229529 A1 * 12/2003 Mui et al. ...................... 705/8

* cited by examiner

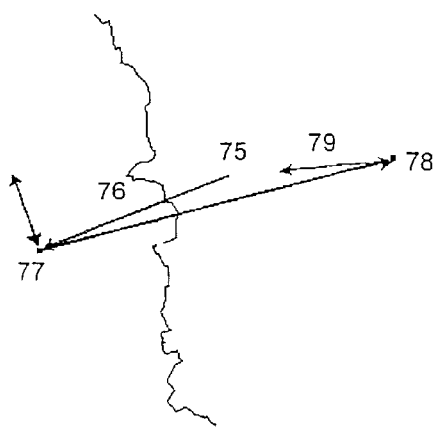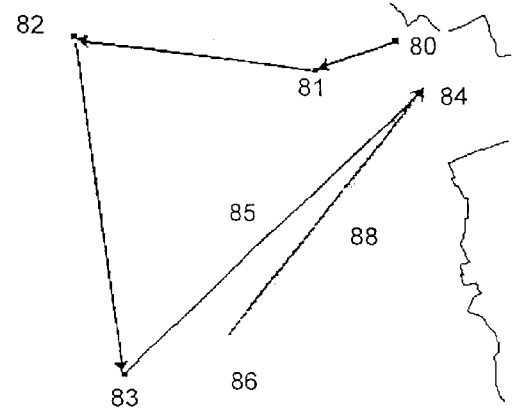
Fig. 11A  Fig. 11B
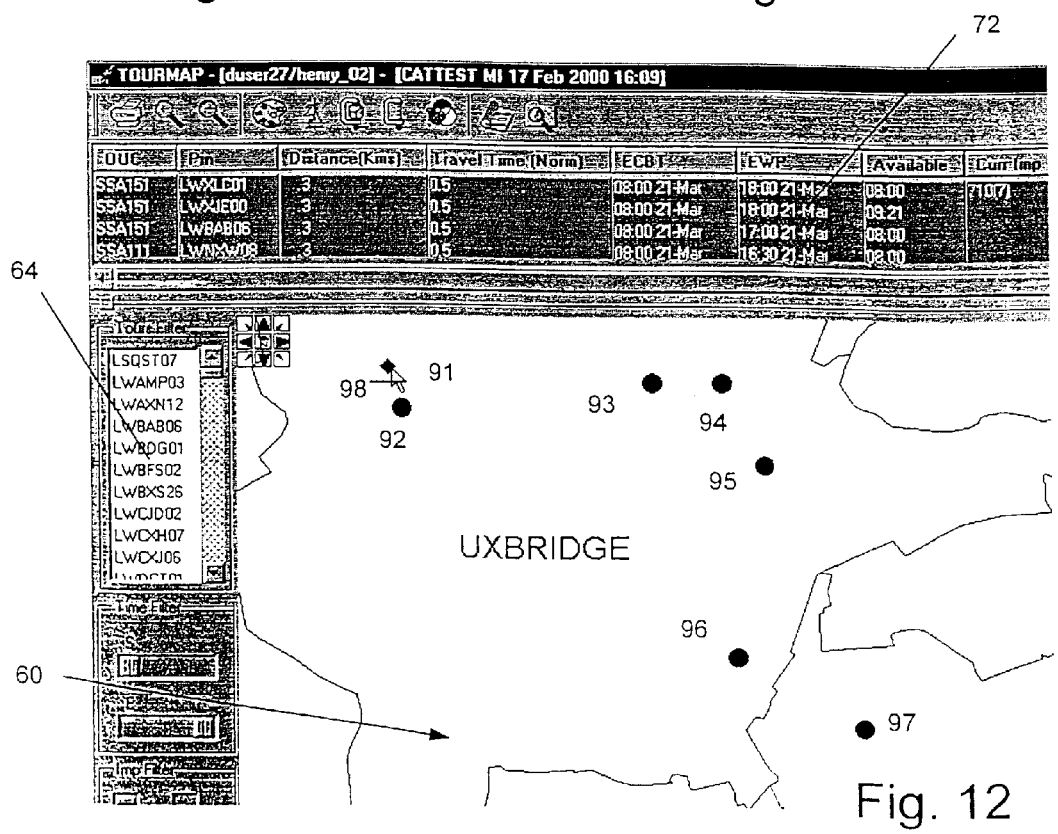
Fig. 12

| Statistics | All Days | Day 0 | Day 1 | Day 2 |
|---|---|---|---|---|
| Working Engineers | 173 | 128 | 136 | 39 |
| Engineers with no scheduled work | 46 | 4 | 126 | 34 |
| Man-hours | 2601.48 | 918.48 | 1293.00 | 390.00 |
| Usable man-hours | 2389.15 | 828.15 | 1197.00 | 364.00 |
| Work load (hours) | 483.33 | 433.75 | 37.80 | 11.78 |
| Scheduled tasks | 263 | 248 | 10 | 5 |
| Unscheduled tasks | 4 | 4 | 0 | 0 |
| Av. task contingency (mins) | 172.00 | 180.00 | 41.00 | 125.00 |
| Tasks per engineer | 2.07 | 2.00 | 1.00 | 1.00 |
| Total Travel (hours) | 17.78 | 17.27 | 0.37 | 0.15 |
| Travel per engineer (mins) | 8.40 | 8.35 | 2.20 | 1.80 |
| Travel per task (mins) | 4.06 | 4.18 | 2.20 | 1.80 |
| Average first task travel (mins) | 1.40 | 1.31 | 2.20 | 1.80 |
| Total idle time (hours) | 1894.07 | 368.61 | 1170.93 | 354.52 |
| Idle time per engineer (hours) | 10.95 | 2.88 | 8.61 | 9.09 |
| Av. scheduled task duration (mins) | 108.89 | 107.00 | 154.20 | 112.00 |
| Av. unscheduled task duration (mins) | 90.50 | 90.50 | 0 | 0 |

Fig. 23

| | Provision | Repair | Other |
|---|---|---|---|
| Target | 0/1 | | |
| Focus | 15/101 | | |
| Core | 0/7 | 4/14 | |
| Basic | 9/93 | 25/40 | 1/1 |
| Bucket | 1/1 | 2/7 | |

Total: 93 Failed: 9 On-target: 84 %Success: 90.32%

HANDLING UNSCHEDULED TASKS IN A SCHEDULING PROCESS

This application is the U.S. national phase of international application PCT/GB01/00874 filed 1 Mar. 2001 which designated the U.S.

BACKGROUND

1. Technical Field of Non-limiting Exemplary Embodiments of the Present Invention This invention relates to scheduling tasks to be performed by a plurality of resources, for example tasks carried out by field engineers on a telecommunications system that extends over a wide area such as a country or state.

2. Description of Related Art

In our PCT/WO98/22897, a scheduling system is described which may be used for a telecommunications system in order to schedule repair tasks to be performed on the system by field engineers. Telecommunications systems conventionally are provided with automatic fault monitoring systems that report repair tasks to be carried out by field engineers and scheduling systems may be provided to communicate schedules of tasks to the field engineers. The engineers then travel from location to location carrying out the tasks, reporting when tasks are completed to the scheduler through a portable computer. The scheduler described in our aforesaid PCT application dynamically updates the schedules for the individual engineers depending on workload and engineer availability, which vary dynamically.

BRIEF SUMMARY OF NON-LIMITING EXEMPLARY EMBODIMENTS OF THE INVENTION

The present invention seeks to improve upon this prior system and provide an improved flexibility of operation so as to optimise the scheduling process.

According to a first aspect of the invention, there is provided a method for scheduling tasks to be performed using a plurality of resources (E), comprising: providing schedule data (26, 42–45) corresponding to schedules of the tasks (11) that individual ones of the resources are to carry out, prepared from task data (4) concerning the tasks to be carried out and resource data (6) concerning characteristics of resources available to carry out the tasks over a given period, together with unscheduled task data (11a) concerning a task (T) not included in the schedules, and; providing data identifying at least one candidate resource to perform the task (T) corresponding to the unscheduled task data by analysing the schedule data and the resource data.

According to a second aspect of the present invention, there is provided a method for scheduling tasks to be performed using a plurality of resources (E), comprising:

receiving schedule data (26, 42–45) corresponding to schedules of the tasks (11) that individual ones of the resources are to carry out, prepared from task data (4) concerning the tasks to be carried out and resource data (6) concerning characteristics of resources available to carry out the tasks over a given period, together with unscheduled task data (11a) concerning a task (T) not included in the schedules, and; providing data identifying at least one candidate resource to perform the task (T) corresponding to the unscheduled task data by analysing the schedule data and the resource data.

The tasks may be performed at different locations in a geographical area by the resources and the schedule data contains location data corresponding to the locations of the resources and the unscheduled task, and the analysing includes comparing the location data for the unscheduled task and the resources to determine said candidate resource.

The suitability of more than one candidate resource may be ranked according to a predetermined criterion such as distance from or time to travel to the unscheduled task. An initial search may be made for a group of resources to be considered as candidate resources.

The outcome of the analysis may be provided on a display of the or each said candidate resource which may include a map showing their locations. Additionally, a tour map may be provided for at least one of the candidate resources.

The invention also includes a program to be run on a computer to perform the inventive method.

The invention also includes apparatus configured to perform the inventive method.

BRIEF DESCRIPTION OF THE DRAWINGS

In order that the invention may be more fully understood, an embodiment thereof will now be described by way of example with reference to the accompanying drawings in which:

FIGS. 11a and 11b illustrate examples of tours carried out by field engineers;

FIG. 12 illustrates the Tour Map window, configured to display details of engineers capable of performing an unscheduled task;

FIGS. 23 and 24 are screenshots of a statistics display window;

FIG. 28 illustrates a display of statistics produced by a what-if session; and

FIG. 29 is a display window for comparing the outcomes of different what-if analyses.

DETAILED DESCRIPTION OF NON-LIMITING EXEMPLARY EMBODIMENTS

System Overview

Figure 1:
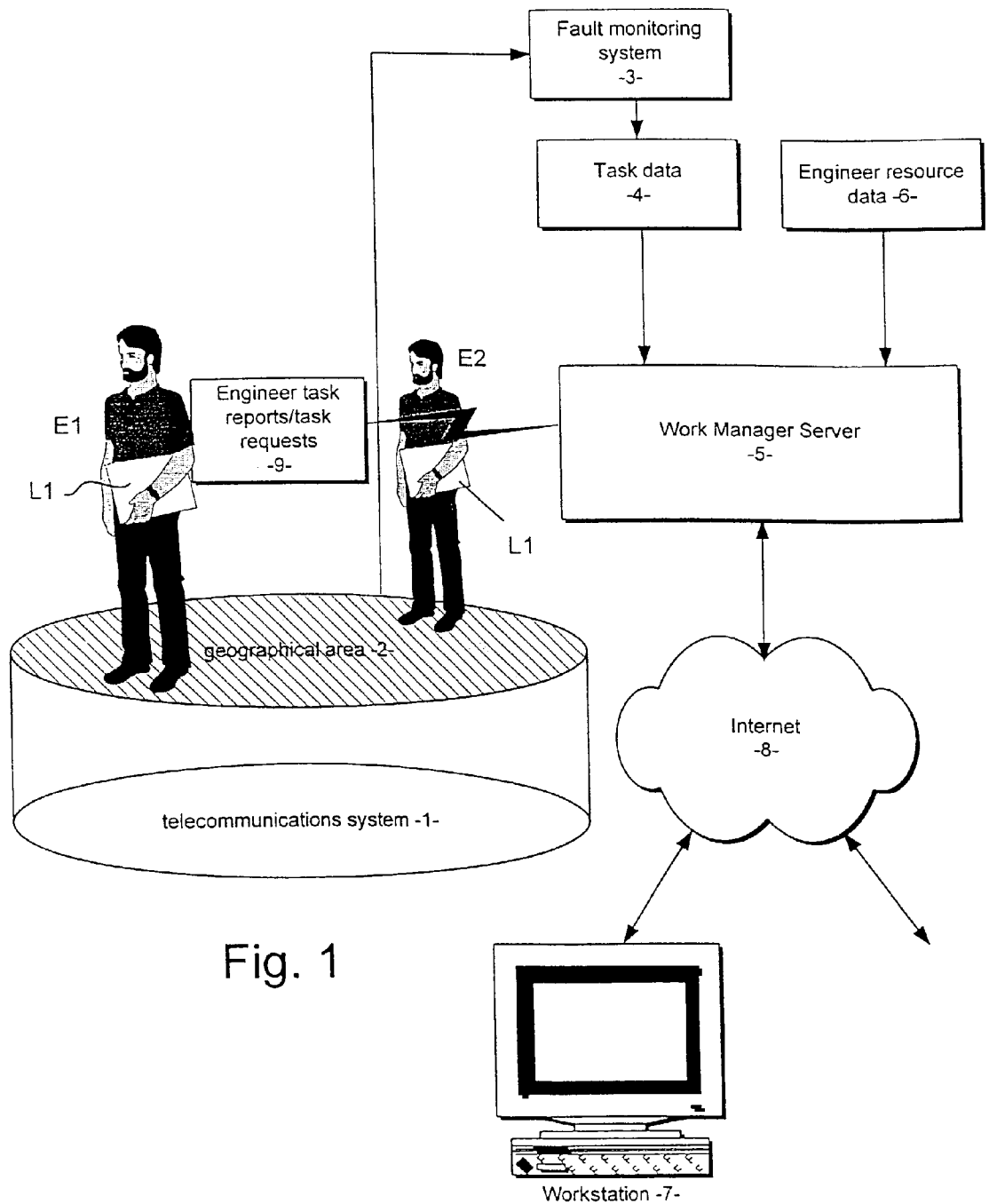
FIG. 1 is a schematic overview of a system for carrying out repair tasks on a telecommunications system.

An overview of the system according to the invention is shown in FIG. 1, for scheduling tasks to be carried out on a telecommunications system 1, shown schematically to extend over a geographical area 2. Engineers E1, E2 ... En carry out tasks on the telecommunications system to keep it in good repair.

It will be understood that the telecommunications system may extend over a large geographical area such as an entire country or state. Considering for example the United Kingdom (UK), there may be of the order of 20,000 people working on the system who typically carry out 150,000 tasks every day.

In order to simplify administration, the geographical area covered by the telecommunications system is broken down into service areas or domains which can be covered by individual groups of field engineers e.g. fifty engineers. For example, in country areas, the domains may cover geographical areas of the order of one county but in built-up areas, the geographical extent of a domain may be much smaller.

The telecommunications system may include a fault monitoring system 3 which identifies work to be carried out on the system. The fault monitoring system produces a list of tasks to be carried out by the field engineers together with information concerning the nature of the tasks and their geographical location. Each task is given an individual job identification number or JIN.

The resulting task data 4 is fed to a work manager server 5 that computes schedules of tasks to be carried out by the individual field engineers E1, E2 ... En. The work manager server handles tasks for the entire telecommunications system 1 although may conveniently comprise a number of network server processors distributed around the country.

The work manager server 5 is additionally fed with information concerning the field engineers E1, E2 ... En from an engineer data source 6. The engineer data includes rostering information i.e. holidays, sickness together with details of the skill level of the engineer for example whether they can work on telephone exchanges, optical fibres or other categories of system equipment. Each field engineer is given a personal identification number or PIN.

The engineers in each domain are organised in a number of individual organisational units which are given a unique organisational unit code or OUC. A (human) management controller for the domain is provided with a workstation 7 to receive management information concerning the schedules prepared for the individual engineers and other management information. The workstation 7 is configured to act as a client for the work manager server 5 and communication between the client and server is carried out by any suitable conventional method. In this example, communication is achieved through the Internet 8 although it will be appreciated that other wide area networks could be used. Thus, a plurality of workstations 7 communicate with the server 5 through the Internet 8 in order to provide management information to the individual organisational units associated with the domains. Only one workstation 7 is shown in FIG. 1 in order to simplify the description.

Each engineer E in the domain is provided with a mobile computing facility such as a hand held terminal e.g. the Husky model FS/2 produced by Husky Computers Limited of Coventry England or a conventional laptop computer L1, L2. This enables the engineers to communicate individually with the work manager server 5, typically through the telecommunications system 1 or alternatively by mobile IP. When an individual engineer E logs onto the server 5, an individual work schedule is provided to the engineer by the server 5. The server periodically updates the schedule to optimise task allocation to the individual engineers. Thus, when a engineer completes a task, a report is provided back to the work manager server 5 in order to enable the server to keep an account of work carried out and to update and optimise the schedules. After completion of an individual task, the engineer is then provided with details of the next task to be carried out. In FIG. 1, the communication of task completion reports and task requests is shown schematically by functional block 9.

Figure 2:
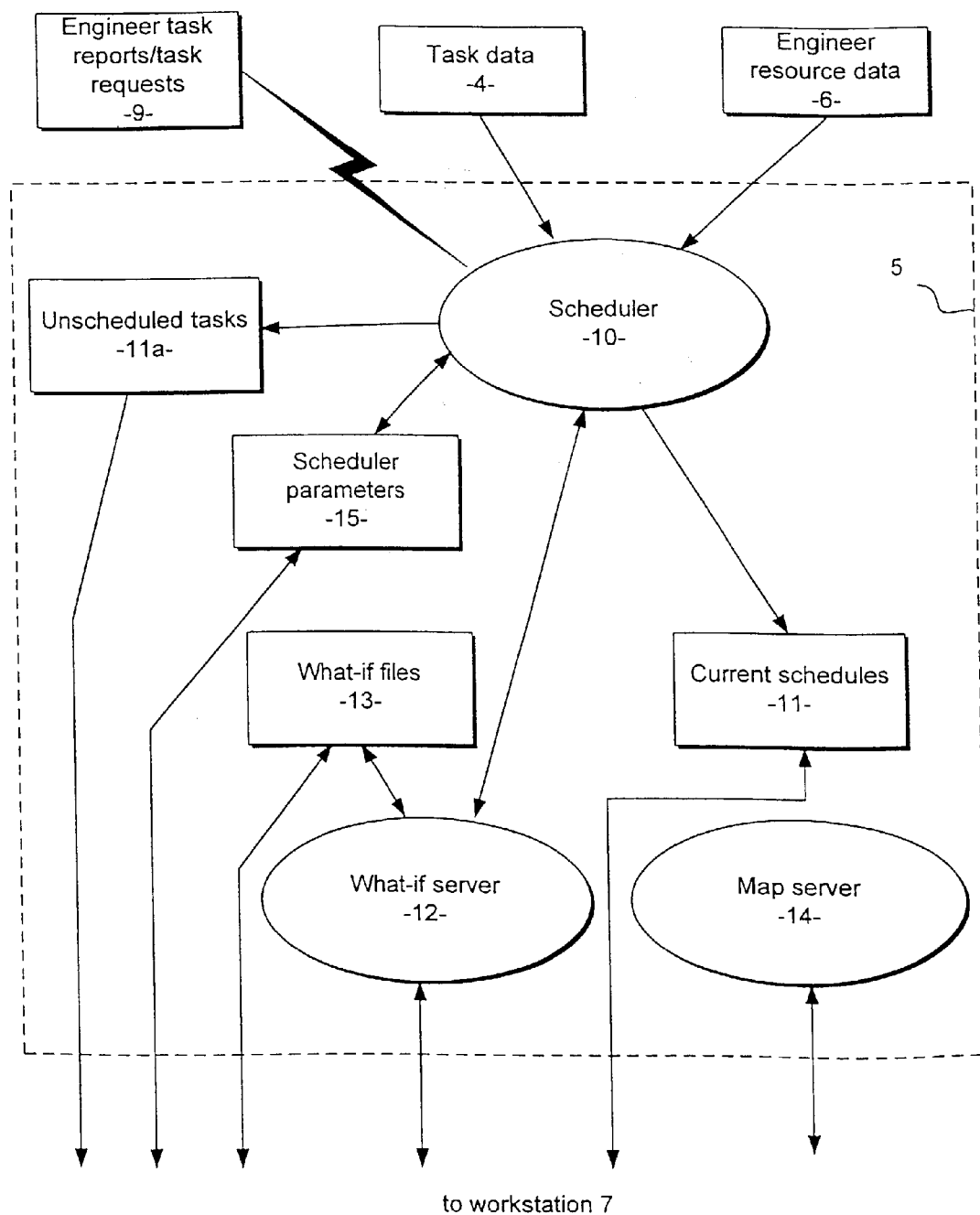
FIG. 2 is a schematic block diagram of the work manager server shown in FIG. 1.

The work manager server 5 is shown in more detail in FIG. 2 and comprises a general purpose computer configured to operate as a server and provide the functionality shown schematically within the hatched outline. The server 5 includes a scheduler 10 which receives the task data 4 and engineer data 6 together with the engineer reports 9. The scheduler 10 performs a simulated annealing algorithm to produce schedules for the individual engineers which are shown schematically as functional block 11. In practice, the schedule data produced by the scheduler 10 is stored in a database in a storage medium such as a hard disc (not shown).

Scheduler 10 may operate to generate an initial series of schedules allocating field engineers to the tasks. The initial schedules may be generated in a two-stage process in which a rule-based system allocates tasks selected as being difficult to allocate e.g. because they are linked to other tasks, and then a stochastic search system completes the rest of the schedule. Periodically the stochastic system may be interrupted to allow a further rule-based system to analyse the schedules created so far, and fix the best ones in the schedule, so that the stochastic system can then concentrate of improving the remaining schedules. This is referred to hereinafter as "hard scheduling" HS. In order to allow the scheduler to handle rapid changes in the requirements for tasks and the availability of field engineers, on a scale faster than the time required to generate the schedules, a schedule modification system is arranged to make changes in the short term, between the schedule updates delivered by the hard schedule generation system. This will be referred to as "simulated annealing" SA. The scheduler 10 is described in more detail in our co-pending PCT/WO98/22897 to which reference is directed.

Even though the scheduler 10 can respond in essentially real time to new task data, there will remain some unscheduled tasks 11a which will need to be allocated to engineers.

Details of the unscheduled tasks 11a may be stored with the schedules 11, although they are shown separately in FIG. 1 for purposes of clarity.

The work manager server 5 also includes a what-if server 12 which can be accessed by the OUCs from their workstations 7 to enable what-if scenarios to be investigated, to provide management information. The outcomes of such what-if investigations are held in files 13 for review by the workstations 7. The what-if server 12 communicates with the scheduler 10 to derive outcomes of what-if investigations.

The work manager server 5 further includes a map server 14 which provides map display data to the individual workstations. As explained later, this enables a map to be displayed corresponding to the domain for the OUC at the workstation 7. In this example, the map server 14 provides a map of the United Kingdom, using the UK National Grid map co-ordinate reference system, which has a predetermined relationship with latitude and longitude. The map is provided with details of the coverage areas of individual telephone exchanges. The engineer data 6 and task data 4 provides details of the location of the various engineers and tasks using the National Grid map co-ordinate reference system. Whilst in this example the map server is shown included in the work manager server 5, it will be understood that a separate map server could be provided at a different location, accessible through the Internet 8 by the individual workstations 7. Also, different map reference coordinate systems could be used.

As previously mentioned, the scheduler 10 uses a rule-based system for the HS/SA processes. The speed of computation and the outcome are a function of the parameters used to define the scheduling process. These scheduler parameters 15 can be modified, and as will be explained hereinafter, the outcome of changing the values of the scheduler parameters can be reviewed at the workstation 7 using the what-if server 12. The settings for the scheduler parameters 15 that were used to prepare a particular schedule 11, are made available to the workstation for use in the what-if processes.

Under limited circumstances, the workstation may be permitted to change the scheduler parameters for the production of subsequent schedules. In practice, the scheduler parameter data 15 may be included with the current schedules but is shown separately in FIG. 2 for purposes of clarity.

Workstation 7—OUC

Figure 3:
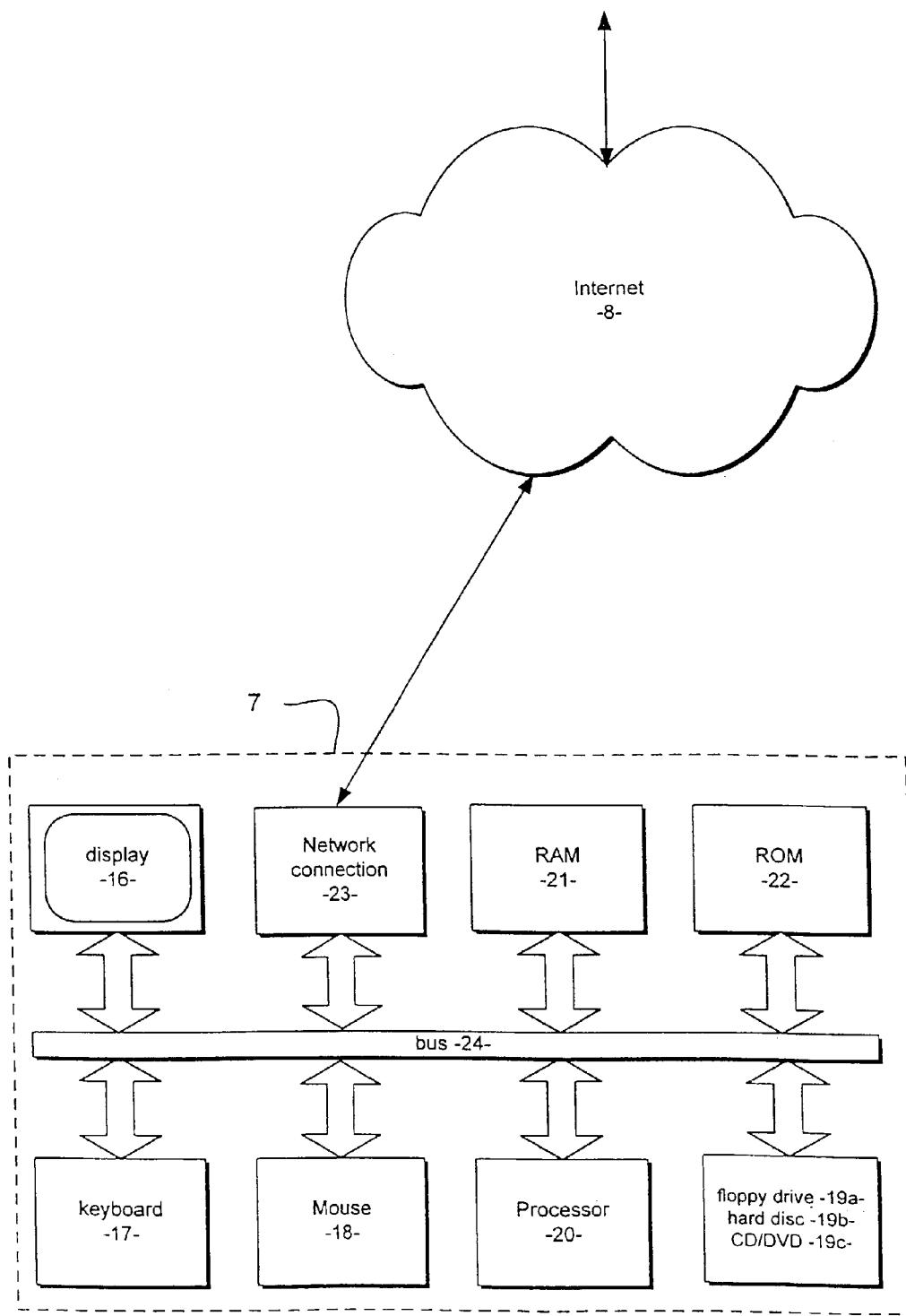
FIG. 3 is a schematic illustration of the workstation shown in FIG. 1.

The hardware configuration of the workstation 7 is illustrated schematically in FIG. 3. The workstation 7 comprises a screen 16 such as a CRT or plasma display, keyboard 17, mouse 18, storage device 19, typically a floppy disk drive 19a, hard disc 19b and CD or DVD ROM drive 19c, processor 20, RAM 21, ROM 22 and network connection 23 such as a modem or ISDN interface. The aforementioned components are interconnected by a common bus 24 as well known in the art.

Figure 4:
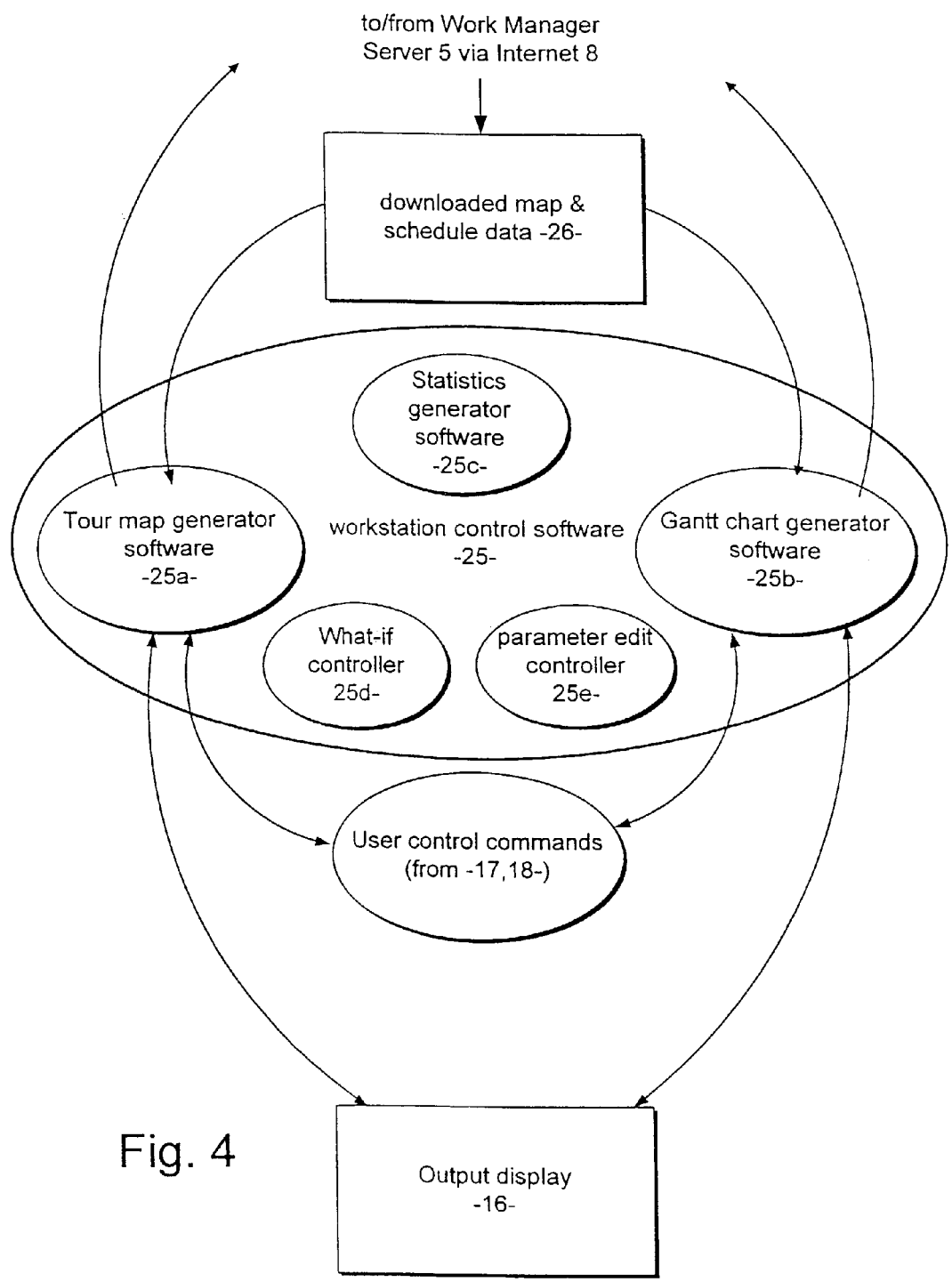
FIG. 4 illustrates schematically the processes performed by the workstation.

Referring to FIG. 4, control software 25 running on the workstation 7 provides five main displays for the output display 16 including a Tour Map produced by tour map generation software 25a, and a Gantt chart produced by a software module 25b. The software modules 25a, 25b operate upon map and schedule data 26 downloaded from the work manager server 5, and a display is provided on the output display 16. The form of the display is controlled by user control commands generated by means of the keyboard 17 and mouse 18. Additionally, the control software 25 includes a statistics generator 25c to provide statistical displays based on the downloaded schedule data 26. Furthermore, the software 25 includes a what-if controller 25d to co-operate with the what-if server 12 as will be explained in more detail hereinafter. Also, a scheduler parameter edit controller 25e is provided to allow editing operations to be carried out on the scheduler parameters 15, as will be described later.

The output management information may be displayed in a Gantt chart window or a Tour Map window to be explained in more detail hereinafter.

Downloading Schedule Data

Figure 5:
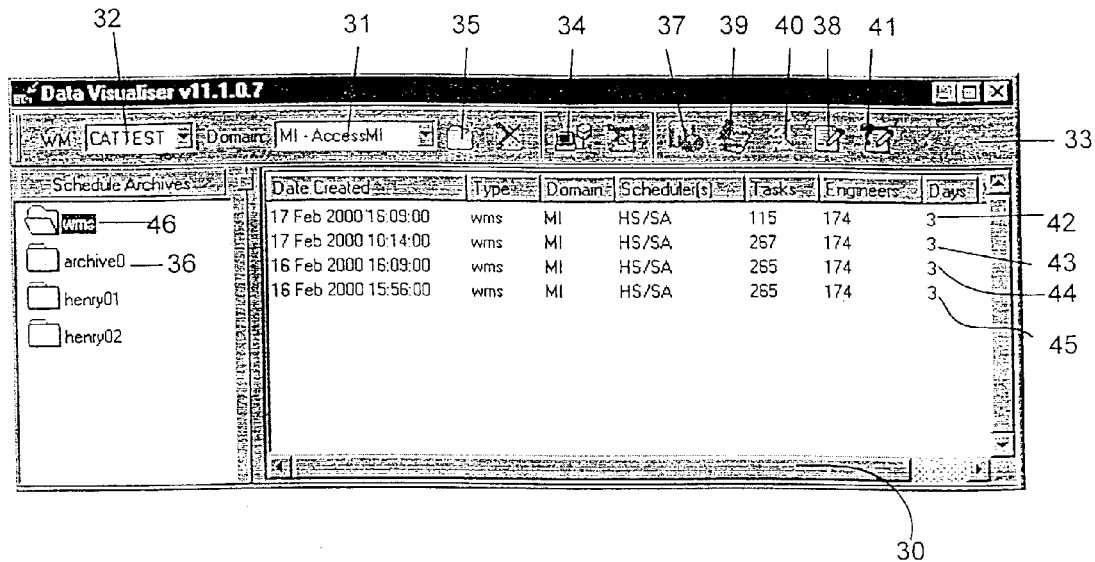
FIG. 5 is an illustration of a main window to receive downloaded schedule data.

The controller at workstation 7 can download schedule data 26 by using a main window 30 illustrated in FIG. 5. Schedules for a particular domain can be selected by means of dialogue box 31. As previously explained, the work manager server 5 may in fact comprise a number of distributed servers around the country and dialogue box 32 permits selection of an appropriate local server.

The window 30 is provided with a button bar 33. Button 34 permits the latest schedule to be downloaded. Button 35 permits schedules to be archived into a selected archive folder 36. Folder 36 is a default archive folder and two other archive folders are shown which have been named by the user. Button 37 selects a statistics display and button 38 selects a parameter editing facility. Button 39 selects a Gantt chart to be described in more detail later and button 40 selects a display of a Tour Map, also to be described in more detail later. Button 41 allows a what-if analysis to be performed.

Four downloaded schedules 42, 43, 44 and 45 are shown in the window 30, held in a folder wms 46.

Considering the schedule 42 by way of example, it was created on 17 Feb. 2000 at 16.09 hrs and relates to the domain MI which, as can be seen from dialogue box 31, is a domain around Greenford, to the west of London, UK. The schedule has been prepared by the HS/SA technique described previously and includes 115 tasks to be performed by 174 engineers over three days. The data in the file includes, the task data 4 and the engineer data 6 for the domain, together with schedule information produced by the scheduler 10 for each of the 174 engineers who are individually identified by their PINs. The tasks are individually identified by their JINs.

Gantt Window

Figure 6:
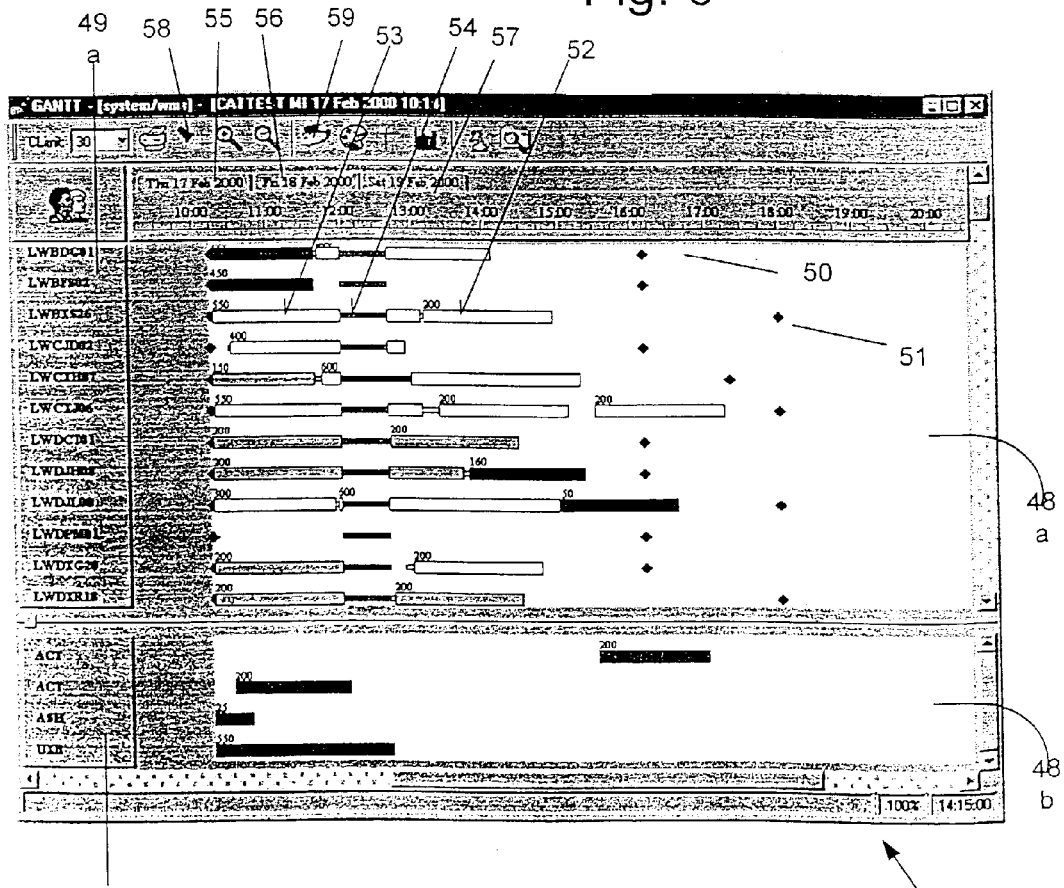
FIG. 6 is a display window for a Gantt chart produced from the downloaded data.

The Gantt chart generator 25b shown in FIG. 4 operates on the schedule data to produce corresponding Gantt charts in a Gantt chart window 48 shown in FIG. 6. The window includes two portions; window area 48a displays scheduled tasks and window area 48b displays unscheduled tasks. On the left hand side of the window, a vertical list 49a of the PINs of the individual engineers is displayed and each has a corresponding time line extending horizontally across the window 48a. Thus for PIN LWBDG01 a time line 50 is provided. Diamond symbols indicate the start and finish of the working day for the engineer concerned. Different categories of work activity are represented by different coloured elongate strips or blocks and a colour code legend is provided in a separate window (not shown). Considering for example the time line 51, the engineer concerned carries out two tasks indicated by strips 52, 53 and undergoes a period of travel 54 between the tasks 52, 53.

As previously mentioned, the schedule data files 42–45 each contain schedule data for three successive days and in the Gantt chart of FIG. 6, the window 48 provides access to individual charts for the three days respectively, accessible by means of tabs 55, 56, 57.

The window 48 also has a search facility button 58 that allows the user to search for individual jobs and engineers by PIN and JIN.

Figure 7:
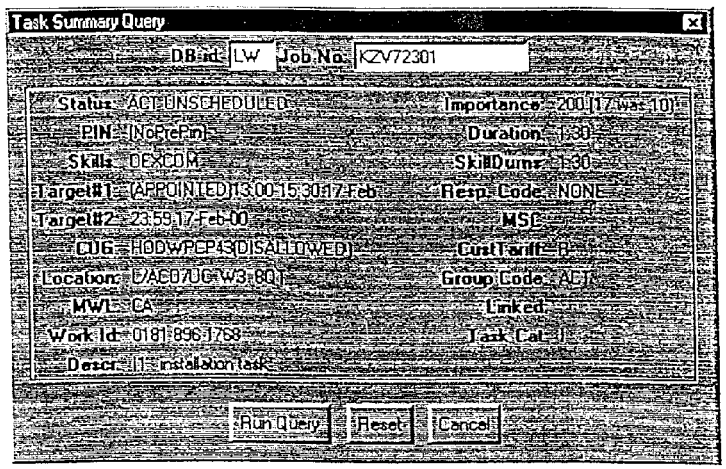
FIG. 7 illustrates a window for a particular task to be carried out by an engineer.

Each task is given an importance score by means of the HS/SA scheduler 10. In this example, the tasks 52, 53 have an importance score of 200 and 550 in FIG. 6. Full task details of an individual task can be obtained by clicking the right hand mouse on the task block e.g. task 52 or 53 which provides a drop down menu (not shown) with an option to retrieve full task details from the schedule data, which is displayed in a floating window as shown in FIG. 7.

As previously explained, unscheduled tasks are displayed in window 48*b*. A list of their location codes, comprising a letter code indicating a telephone exchange is given in vertical window 49*b*.

Each task in the schedule has a contingency figure associated with it. This comprises the number of "spare" minutes between the start time scheduled for a task and the projected latest start time, as projected by the scheduler 10. If the task were to start after this latest start time it would then fail. For an appointed task, for example, this latest start time is represented by the end of an appointment slot. The Gantt chart shown in FIG. 6 can be operated by using a contingency control button 59 to display the contingency time for each task in a different colour set. This display gives an at-a-glance indication of tasks which are currently safe from failure, those with a relatively low contingency, those which have already failed to be handled by an engineer and those which are shown as being scheduled such that they will fail.

This display of contingency values allows the user at workstation 7 to identify problem areas and make a manual intervention to the scheduling scheme, if needed.

The Tour Map Window

The tour map window allows the schedule for individual engineers to be mapped as a tour on a map corresponding to the domain 2. Appropriate map data is downloaded from the map server 14 shown in FIG. 2, to the workstation 7 and the tour map generation software 24 shown in FIG. 4 operates on the schedule data to provide a pictorial display of the tour to be carried out by one or more field engineers as they move from task to task at different geographical locations according to their individual schedules specified in the downloaded schedule data 26.

Figure 8:
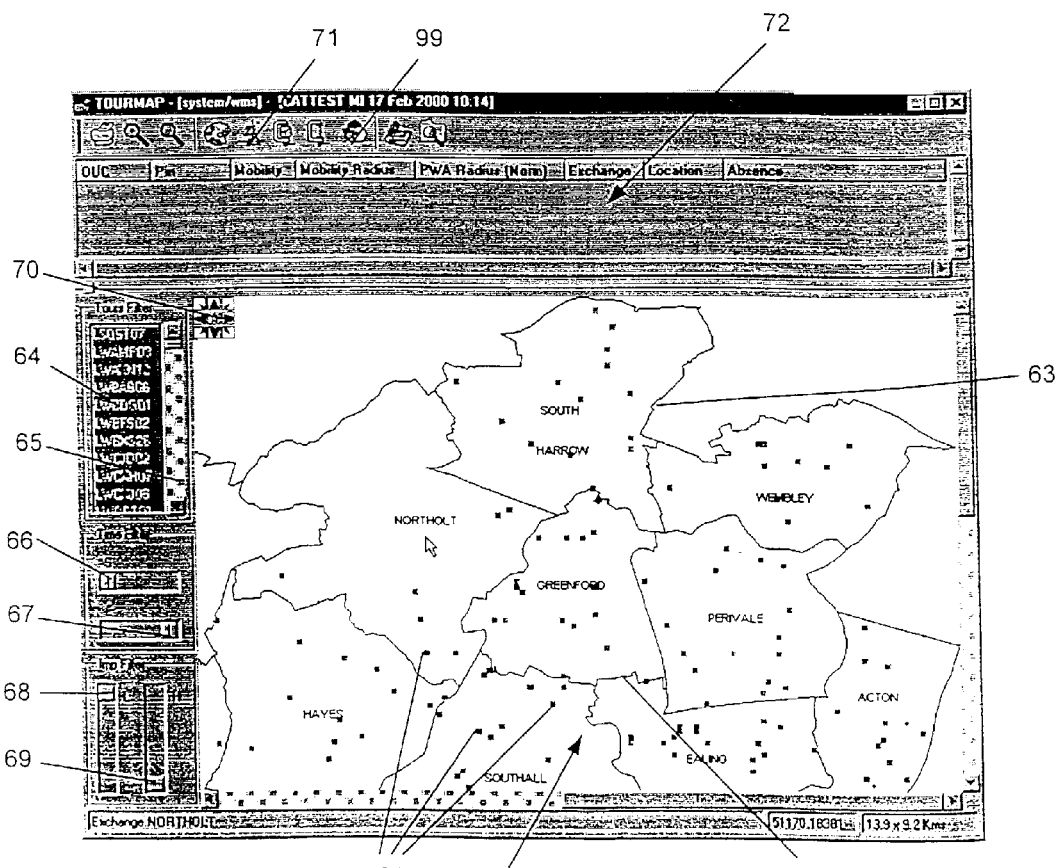
FIG. 8 illustrates a Tour Map window.

An example of the tour map window 60 is shown in FIG. 8. In this instance of the window, map data is shown for a domain that includes telephone exchanges at and around Greenford. Outstanding tasks are shown as rectangular dots 61 on the map display. The boundary of the telephone exchange area 62 for Greenford is shown together with a corresponding area 63 associated with an exchange "Hayes". On the left hand side of the window, a so-called Tours Filter dialogue box 64 displays the PINs for field engineers for the domain. The Tours Filter 64 allows the tour for one or more engineers to be selected by clicking with the mouse on the relevant PIN as will be explained in more detail later. A scroll bar 66 allows all the PINs to be displayed.

The duration of the displayed tour can be selected by means of a time filter which comprises two slider controls operable by using the mouse. Slider control 66, marked "S" sets the start time for the displayed tour and the slider 67, marked "E" sets the end time.

A further filter is provided to control the display so as only to display tasks with an importance score within a particular range. Slider control 68 sets the lower threshold level of importance score whereas slider 69 sets the upper threshold for the displayed importance score. Tasks lying outside of the range set by the slider controls are not displayed.

A compass rose 70 is displayed in the top left hand corner of the map area, which can be used to navigate quickly around the map. Clicking on one of the sectors of the rose moves the viewing area across the map by one full screen. Clicking on the centre of part of the compass rose returns the user to the central part of the map display.

Figure 9:
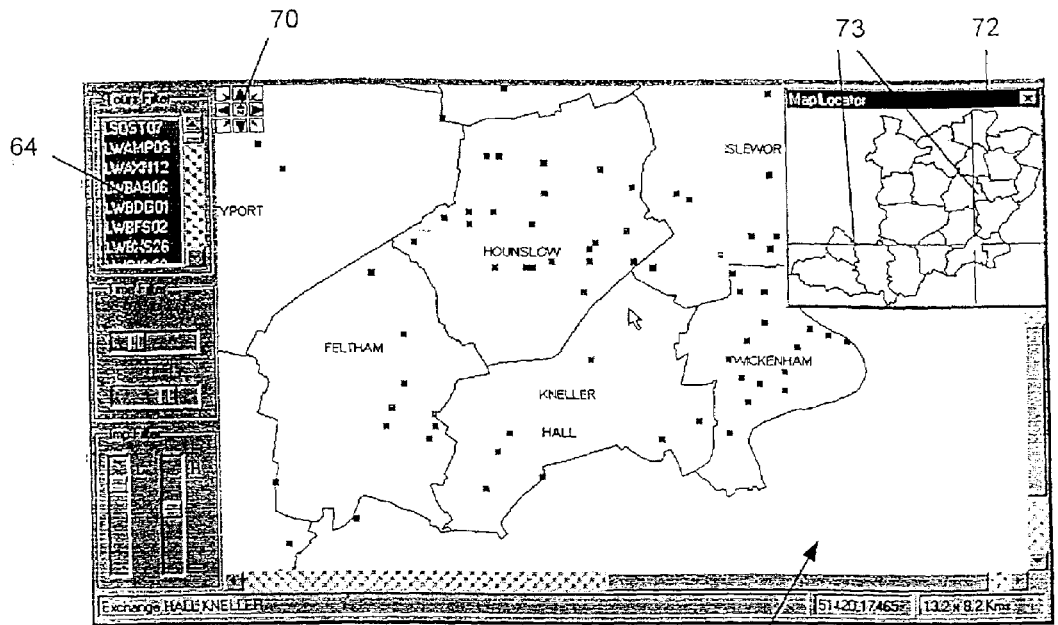
FIG. 9 illustrates a map locator window within the Tour Map window.

When initially displaying the map or when several jumps have been made by scrolling around the map, it may be difficult for the user to ascertain which part of the map is being displayed. To assist, a map locator window may be displayed by operating a map locator toggle button 71 on the button bar of window 60. This displays a small window 60' which displays the entire map for the domain, with cross hairs 73 indicating the centre-point location for the main map window 60, as shown in FIG. 9. In this case, the cross hairs 73 are centred on the exchange Kneller Hall, to the south of Greenford. It will be understood that the window 73 can be toggled on and off using the button 71.

Displaying Tours

Referring to FIG. 8, the tour map window 60 has a engineer data display area 72. When the tour map window 60 is first opened, the display area 72 is blank and the tours filter window 64 has all the PINs for the engineers in the domain highlighted, with the result that all tasks are displayed on the previously described Gantt chart are displayed on the map. However, individual tours for one or more engineers can be selected by selecting one or more PINs in the window 64 by means of the mouse.

Figure 10:
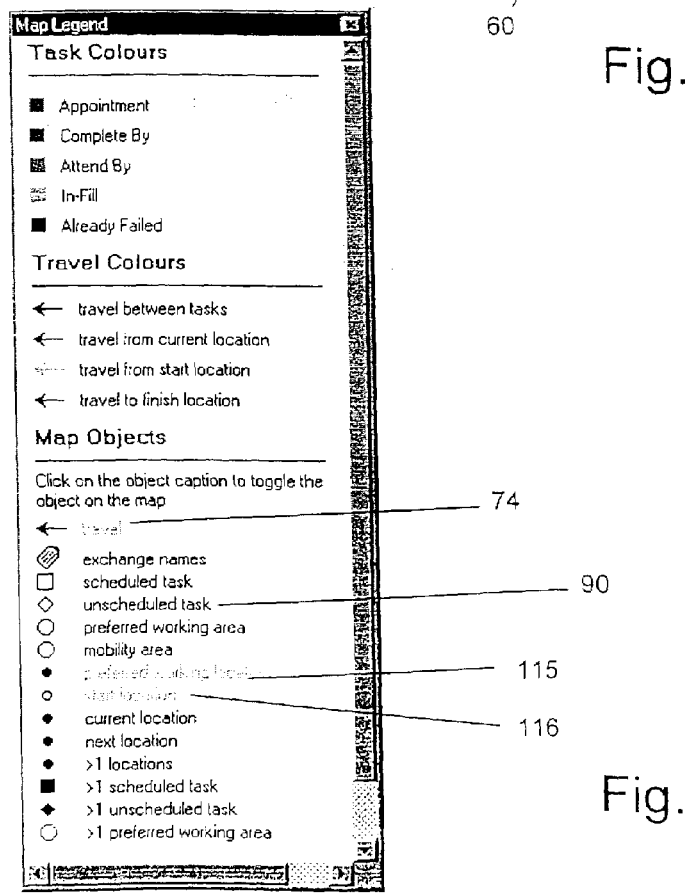
FIG. 10 illustrates a window that displays a map legend for the Tour Map window.

If tours for two or three engineers only are selected, then arrows can be displayed to link the various points of call for an individual engineer, according to a map legend shown in FIG. 10. From FIG. 10, it will be seen that different types of tasks are displayed with different legends and, by clicking on the travel key 74, arrows connecting the various tasks for an individual engineer, within the time frame set by slider controls 66, 67, are displayed on the map.

Examples of tours are given in FIGS. 11*a* and 11*b*.

FIG. 11*a* illustrates a tour for the remainder of a current day. The engineer's current location 75 is highlighted in a distinctive colour—red in this example, and arrow 76 indicates the journey to be made to the next task 77. The symbol 76 indicates that more than one task is to be performed at this location. Thereafter, the field engineer is to travel to deal with task 78. Then, the engineer returns home, at the end of the day, as indicated by arrow 79, which has a distinctive colour green in an actual example.

FIG. 11*b* illustrates a tour for a engineer, which covers the remainder of the current day, together with the entire following day. The engineer travels from current location 80 (which may be displayed in red) to three other sites 81, 82, 83, in turn. At the end of the day, the engineer travels from the site 83 to a start/finish location 84 as indicated by arrow 85 (which may be colour coded-green). The next day, the engineer travels to a first task 86, as indicated by an arrow of a distinctive colour indicating travel from the start location, e.g. yellow, indicated by arrow 87. The engineer spends all day at location 86 and then returns home as indicated by arrow 88, which is colour coded green.

In use, the display area 72 shown in FIG. 8 includes details for the field engineers for which tour maps are displayed. This will be explained in more detail later.

It is possible to display details of the individual tasks by using the mouse to click on a task such as an individual task 61 shown in FIG. 8 and, by performing predetermined mouse operations, a display corresponding to FIG. 7 can be obtained for each individual task. Furthermore, when multiple tasks are to be found at the same location, further mouse operations can be performed to display each task individually.

Unscheduled Tasks

The system also can display unscheduled tasks. Referring back to FIG. 2, it will be recalled that the scheduler 10 may not schedule all tasks and provides a list of unscheduled tasks 11a. Information concerning these unscheduled tasks is provided to the workstation 7 in the downloaded data 26 shown in FIG. 4.

To display only unscheduled tasks, a "scheduled task" option 90 in the map legend window shown in FIG. 10, is disabled such that only unscheduled tasks, coded with a symbol ♦ are displayed at relevant locations in the map window 60. Alternatively, the unscheduled tasks can be displayed by clicking the right hand mouse button on the tours filter window 65 shown in FIG. 8 so as to deselect all PINs and thereby hide their scheduled tasks on the map display in window 60.

The window 60, in response, displays only those tasks which were unscheduled at the time that the relevant schedule was run. The details of the unscheduled tasks can be displayed individually by using the mouse to click on them as previously described for scheduled tasks so as to provide a display corresponding to FIG. 7 for an individual unscheduled task.

FIG. 12 illustrates a partial, enlarged view of the tour map window 60 shown in FIG. 8, when unscheduled tasks are displayed. The location of unscheduled task 91, disposed near the English town of Uxbridge is shown. Also, the current locations of field engineers are shown by the circular dots 92, 93, 94, 95, 96. Details of the current locations of the field engineers are shown in the display window area 72 by reference to their PIN and OUC. The selection of engineers to be displayed in this window is determined by right clicking on the relevant unscheduled task—task 91 in this example so as to provide a display in area window 72 concerning the PIN, OUC, distance and travel time of adjacent field engineers. This information is computed by the tour map software 25a shown in FIG. 4. Thus, the operator at workstation 7 can determine how best to deal with unscheduled tasks e.g. in an emergency situation, in which an engineer needs immediately to be dispatched to deal with the unscheduled task. Thus, the operator at workstation 7 can manually override the schedules provided by the work manager server 5.

Figure 13:
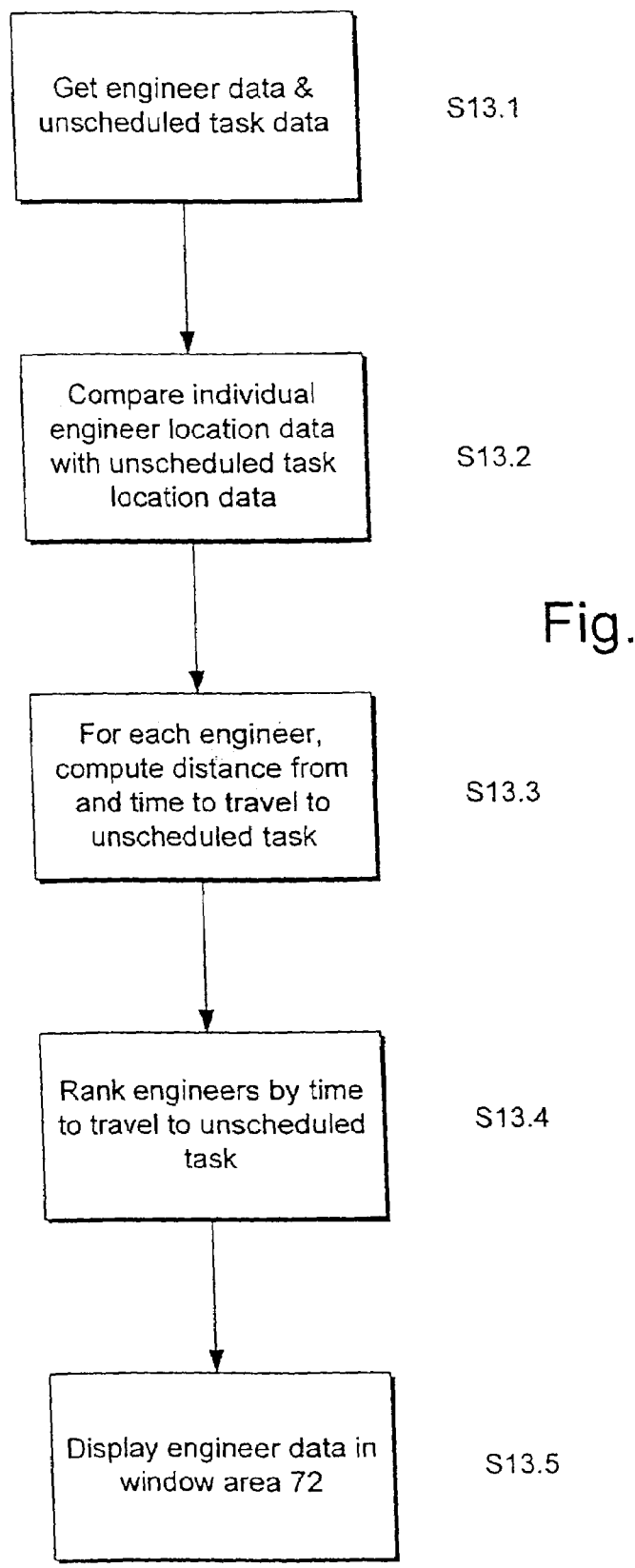
FIG. 13 is a block flow diagram for providing the Tour Map display shown in FIG. 12.

FIG. 13 illustrates the process carried out by the Tour Map software generator 25a to produce the display of engineers in window area 72. At step S13.1, relevant engineer data are obtained from the engineer data 6 shown in FIG. 1. The engineer data may relate to all the engineers for the domain or a selected group of them. The selection process is described in more detail hereinafter with reference to the Find Task Engineer Query.

Then, at step S13.2, the task location data for the unscheduled task, that has been selected by means of the mouse cursor, is compared with the location data for each individual engineer so that at step S13.3, the relative distance and the time to travel to the unscheduled task is computed for each engineer.

Then, at step S13.4, the engineer data is ranked in order of preference on the basis of the time taken to travel to the unscheduled task. However, alternative rankings may be used, such as the distance to travel to the unscheduled task. The resulting data is then displayed in the window area 72 shown in FIG. 12.

PWA Query Tool

When the Tour Map window 60 is initially opened, no field engineer data is displayed in the window 72 and only the task locations are displayed on the map in window 60, together with travel arrows, if selected.

Figure 14:
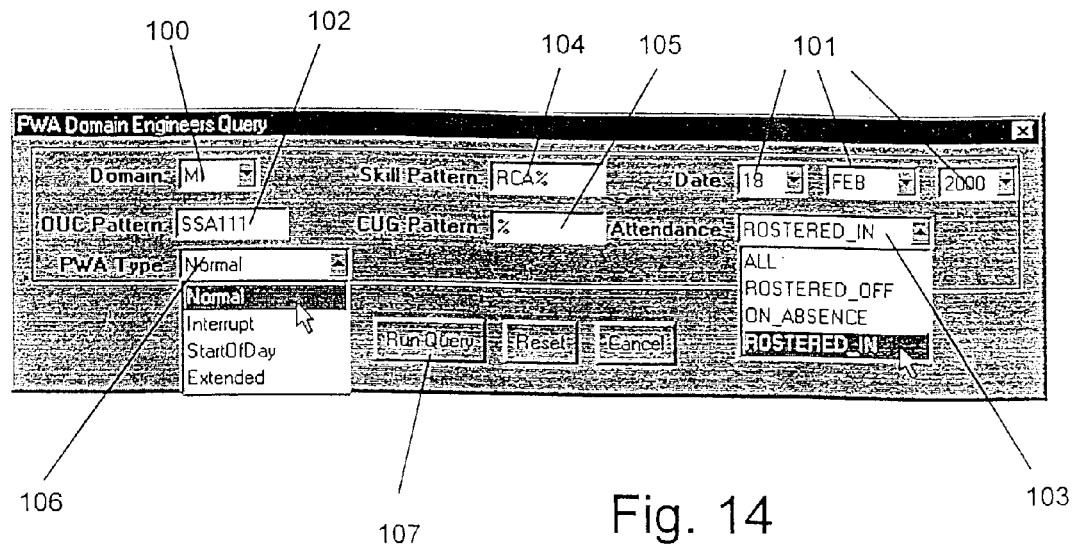
FIG. 14 illustrates a dialogue box for carrying out a query concerning engineers for performing tasks within their preferred working areas.

In order to determine the location of a specific field engineer or group of engineers who fit certain criteria, a PWA query tool is selected from the button bar using button 99 shown in FIG. 8. This displays a PWA query dialogue box as shown in FIG. 14. The dialogue box allows certain search criteria to be set in respect of field engineers. Data selection fields, which use drop down menus (which can also be overtyped) are provided to set up the search criteria. Field 100 sets the domain, field 101 the date and field 102 sets the OUC.

There are a number of further fields which select details from the engineer data 6 described with reference to FIGS. 1 and 2. An Attendance field 103 allows engineers to be selected on the basis of whether they are rostered in (i.e. working), rostered off, absent (e.g. on holiday) or all engineers can be selected.

Field 104 permits engineers to be selected in terms of their skill levels. As previously described, the engineer data indicates the skill levels of individual engineers.

Field 105 permits engineers to be selected depending on whether they are a member of a closed user group or CUG. These groups may be for specific secure or specialist areas such as banks, particular industrial sites and the like where only engineers with a predetermined security clearance are allowed access.

Field 106 allows a preferred working area or PWA for the engineers to be selected. Each engineer has a preferred working area which is displayed on the maps as circle centred on a particular telephone exchange from which the engineer usually operates. Four menu choices are provided. A "normal" PWA comprises a circle of a predetermined radius based on the telephone exchange.

An "interrupt" option permits the radius of the PWA circle to be expanded in order to increase the effective mobility of engineers in order to deal with the occurrence of e.g. a very important urgent task. A "start of day" option allows the PWA to be modified to take account of the distance that an engineer may need to travel from home at the start of the day. The "extended" option allows the PWA circle radius to be enlarged for example to deal with situations where only a few engineers are available e.g. due to sickness and a decision is made deliberately to increase the working area to deal with the resulting engineer resource shortfall.

Figure 15:
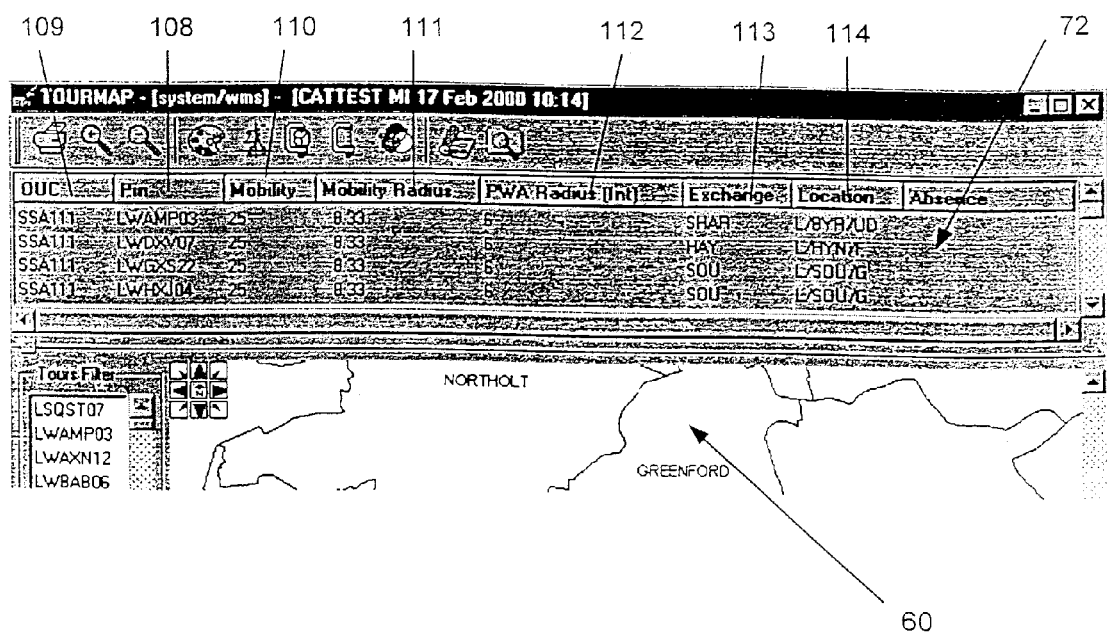
FIG. 15 is a partial view of the Tour Map window showing the details of engineers found as a result of the query displayed in FIG. 14.

When the fields have been appropriately set, a run query button 107 is operated, which results in a display in the window area 72 as shown in FIG. 15.

The PINs of engineers which satisfy the search criteria are displayed in a column 108 together with a corresponding OUC in column 109. The column relating to the mobility of the engineers together with the corresponding mobility radius are presented in columns 110, 111. The mobility radius corresponds to the radius of a circle based on the current working location of the field engineer and indicates how far the engineer can travel during the remainder of the working day. The PWA radius for the engineers is displayed in column 112, with a value corresponding to the search criteria set in dialogue box 106 in FIG. 14. The PWA radius is centred on a particular exchange indicated by a three digit code in column 113. The location of the exchange on the map is indicated by a code presented in column 114.

Figure 16:
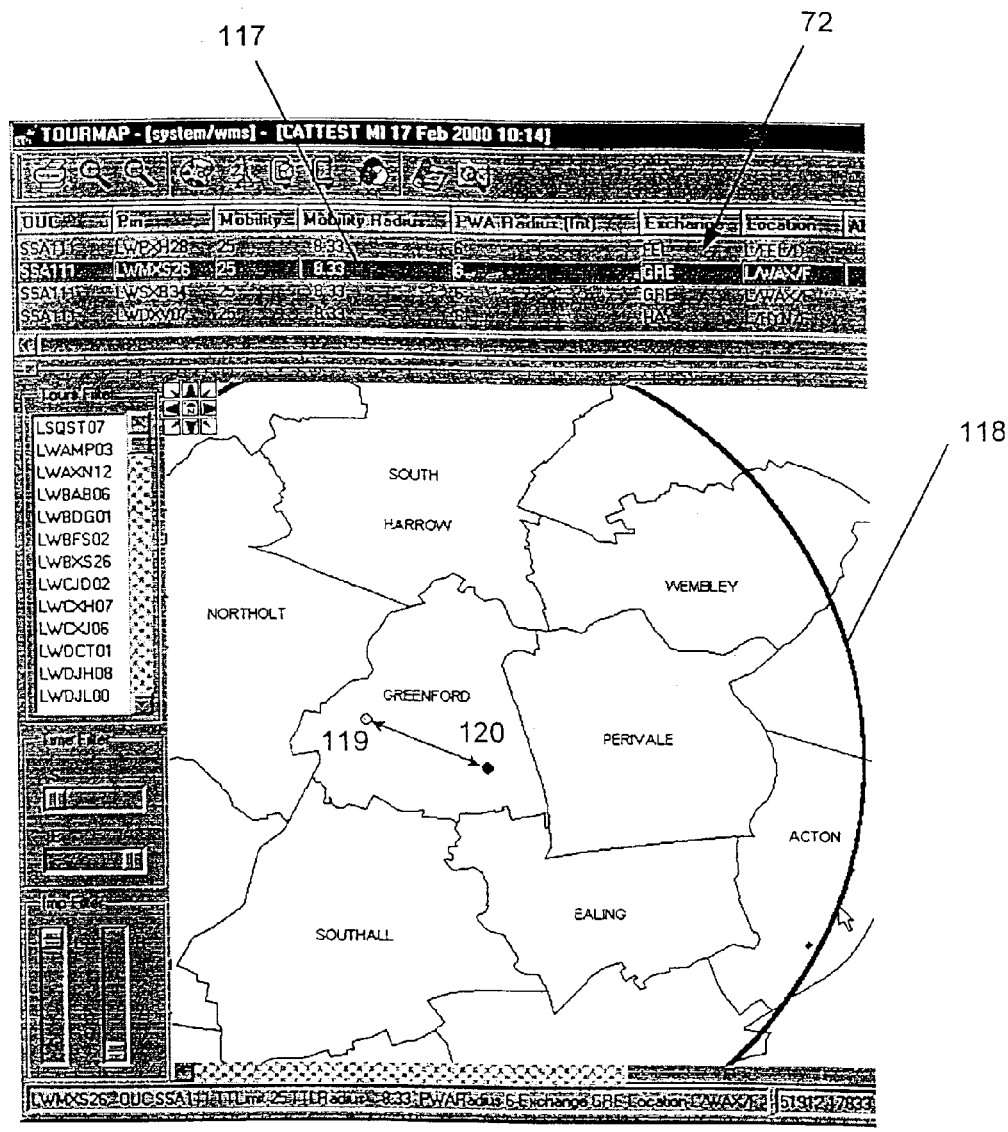
FIG. 16 is an illustration of the Tour Map window when the preferred working area for a selected engineer is displayed.

This data can be displayed on the map in window 60 for one or more engineers, by selecting the PIN in display 72, using the mouse. The resulting display is shown in FIG. 16. Additionally, if desired, the start and preferred working locations for the engineers concerned can be displayed by making an appropriate selection in the map legend window, using menu options 115, 116 shown in FIG. 10.

In FIG. 16, a display corresponding to engineer PIN LWMXS26 is shown corresponding to a highlighted display line 117 in display area 72. The display includes a circle 118 with a radius corresponding to 8 km centred on the preferred working location, namely the Greenford exchange 119. The actual working location 120 is also shown and a mobility circle with a mobility radius of 8.33 km may also be shown, although it is omitted from FIG. 16 for purposes of clarity.

Checking Area Coverage by Engineers

The system is configured to allow the area of coverage on the map to be checked for different criteria such as a particular OUC, for the current day or for some certain date in the future, specifying the normal PWAs or other PWAs as appropriate.

Firstly, a PWA query is carried out as previously described using appropriate PWA type, skill OUC and CUG patterns and an appropriate date, using the PWA query dialogue box illustrated in FIG. 14. It will be understood that this populates the display window area 72 with the details of engineers capable of providing the particular coverage of interest.

Figure 17:
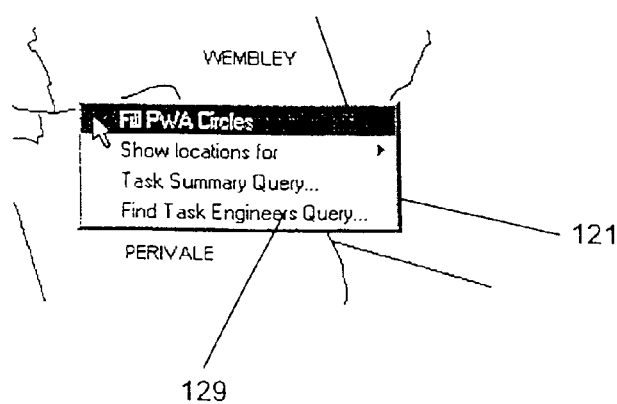
FIG. 17 illustrates a drop down menu that is mouse-selectable to fill-in PWA circles.
Figure 18:
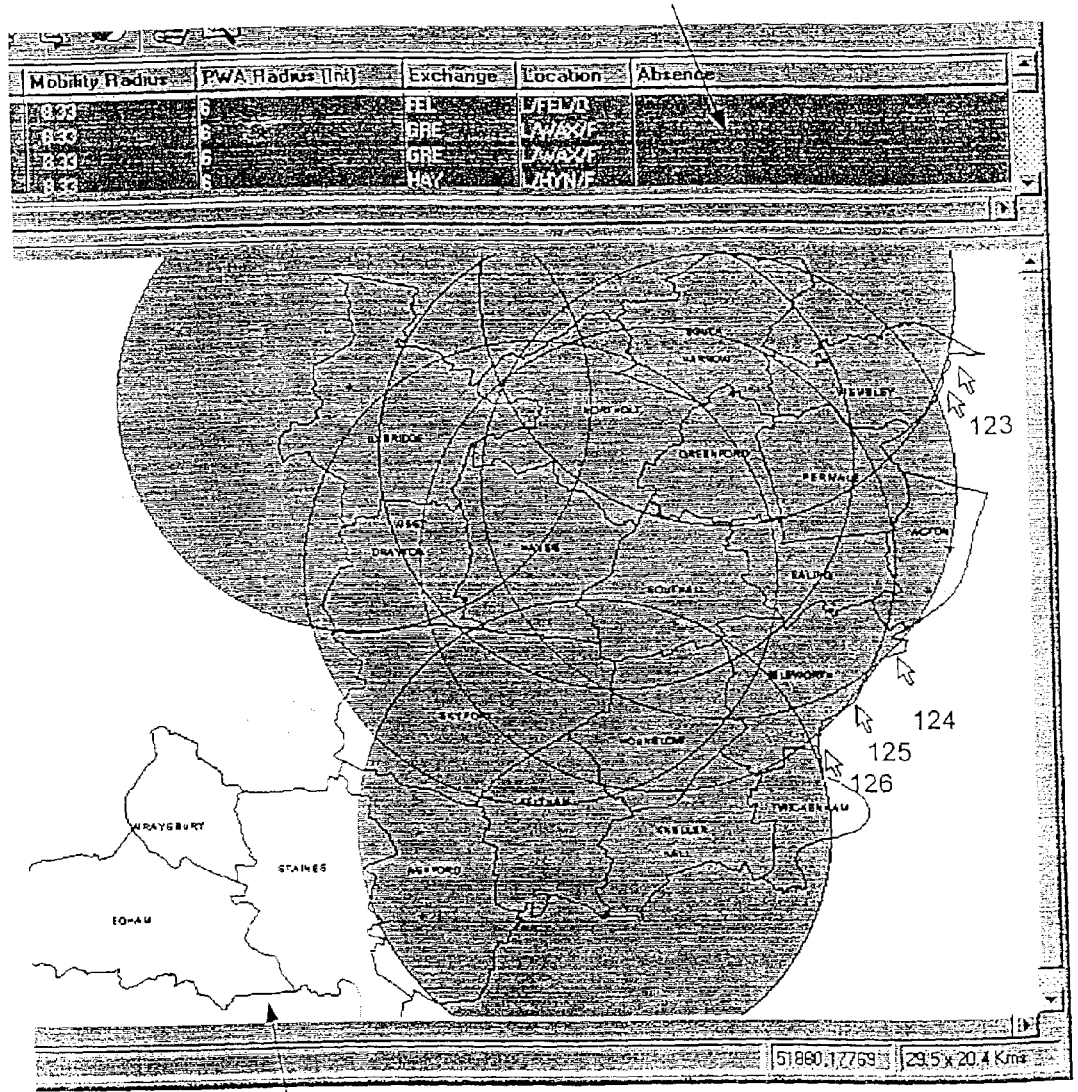
FIG. 18 illustrates the Tour Map window with PWA circles shaded to determine engineer coverage.

Then the right hand mouse button is operated, which displays a menu 121 shown in FIG. 17. The menu option "Fill PWA Circles" 122 is selected using the mouse, which results in the PWA circles for all the selected engineers being displayed, each filled with a shading as shown in FIG. 18. The shaded area can be compared with the map area and regions of no coverage can readily be identified. In FIG. 18, regions 123 have no coverage, together with regions 124, 125, 126. The small regions 125, 126 would not otherwise readily be identifiable.

Figure 19:
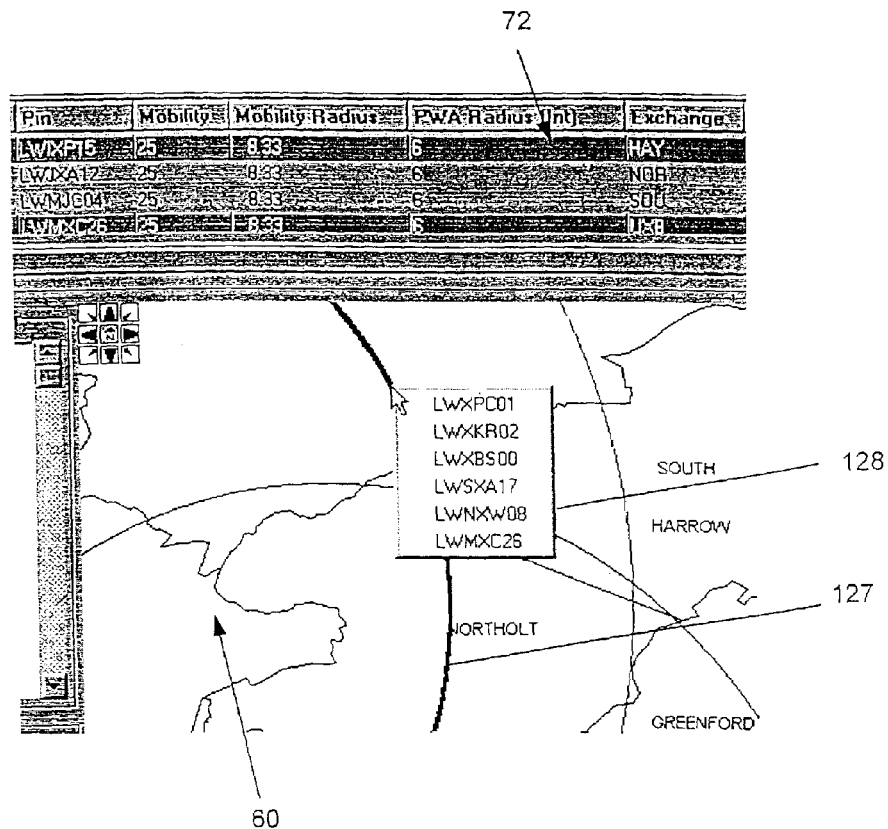
FIG. 19 illustrates the Tour Map window when PWA circles overlie one another.

A list of the engineers for which the filled-in PWA circles are displayed, is given in the display area 72.

Where several PWA circles overlie one another, it is possible to obtain information concerning the pins for the engineers concerned, by clicking right hand mouse button with the cursor disposed on the PWA circle as shown for circle 127 in FIG. 19. In this way, the PINs for the overlying PWA circles are displayed in a drop down list 128.

Find Task Engineer Query

The controller at workstation 7 may need to find an engineer who can take on a currently unscheduled task. Alternatively, the controller may need to identify a engineer who can take on a task which is already part of another engineer's tour, e.g. because the engineer's van has broken down or because the engineer is tied up in a current task that will take longer than scheduled.

As previously explained with reference to FIG. 17, using the right hand button of the mouse provides a drop down menu and one of the menu options is "Find Task Engineers Query" 129 shown in FIG. 17. A similar menu option can be obtained when the Gantt chart is displayed by right-clicking with the mouse. Selection of this menu option displays a dialogue box 130 illustrated in FIG. 20. If the right hand mouse button was operated with the mouse cursor aligned with a particular task, the details of the task concerned will automatically be displayed in the dialogue box 130. Thus, the current JIN, domain and date are automatically supplied to the field windows 131, 132, 133. Alternatively, if the right hand mouse button is clicked in a background area of the map instead of on the task, and the find task engineers query option 129 is selected, the fields 131, 132 and 133 will be blank and the user can supply relevant details and then perform the query. This can be useful if the task concerned is not displayed on the map. The user can then set the PWA type in field 134. Consideration of the skill level, CUG, PWA and mobility can be selectively enabled using fields 135, 136, 137 and 138, depending on the requirements of the user.

Figure 21:
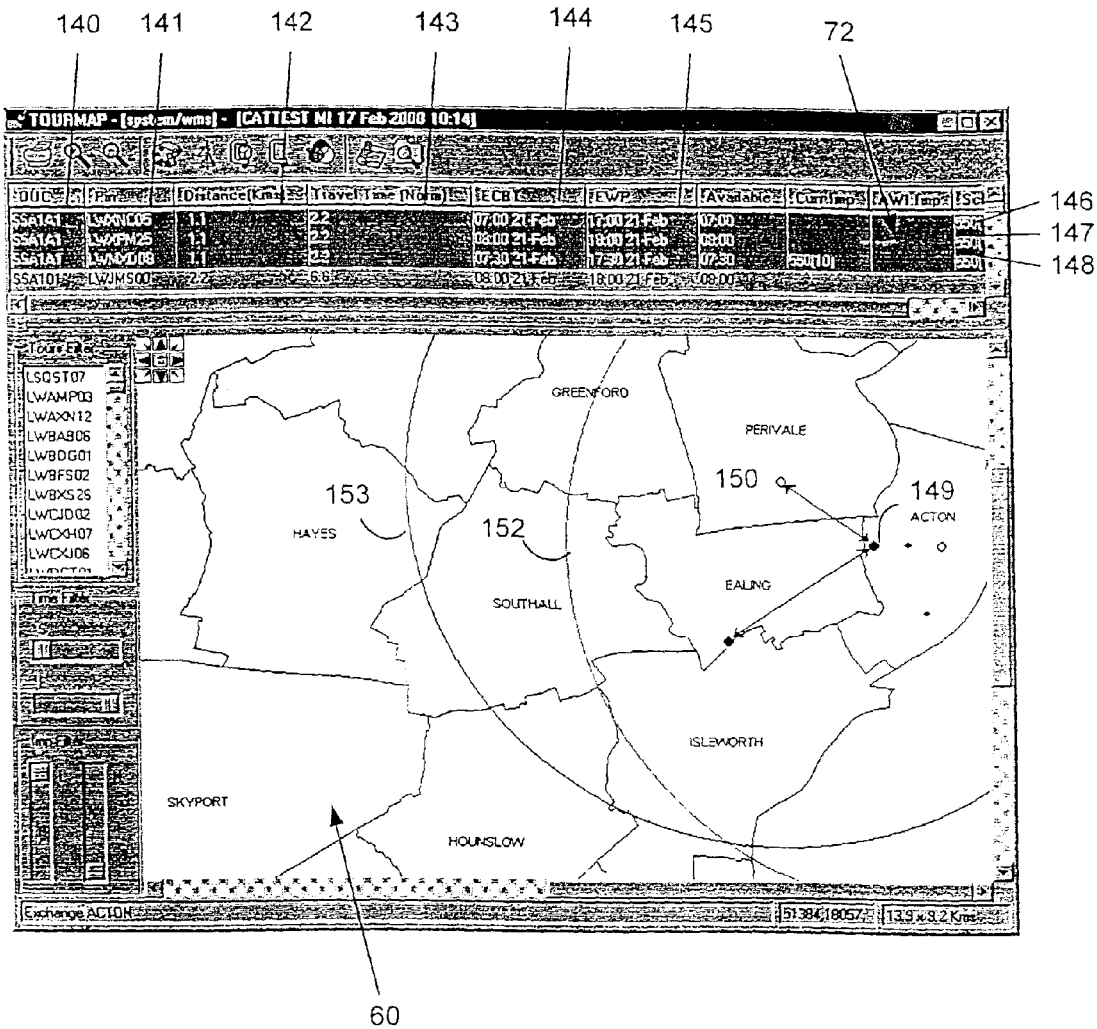
FIG. 21 illustrates a Tour Map window when the outcome of the query of FIG. 20 is displayed.

Then, a run query button 139 is actuated and the tour map generation software 24 retrieves current details of field engineers that fit the search criteria in the query dialogue box 130, and displays their current locations on the tour map in tour window 60, as shown in FIG. 21. The display window area 72 becomes populated with the details of all field engineers retrieved by the query i.e. those that fulfil the query criteria and who have current or future schedule hours available to carry out tasks, on the date selected.

As shown in FIG. 21, the available engineers are listed in order of preference in the display area 72 in terms of their PIN and OUC, listed in column 140, 141, with details of their distance from the location of the task, given in column 142 together with an estimated travel time to the task in column 143. An estimated available start time for the task is given in column 144 and a [?] is given in column 145.

Figure 20:
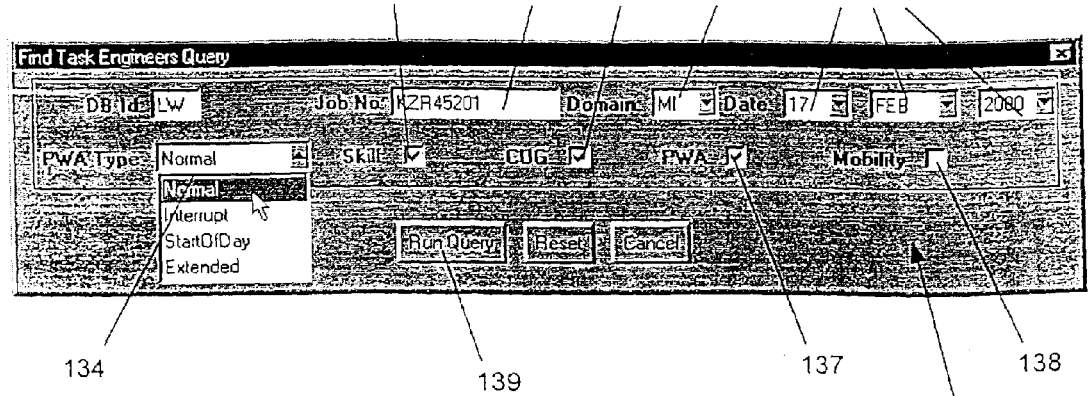
FIG. 20 illustrates a dialogue box for performing a query to find engineers capable of performing a particular task.

In the map window, details for the first three engineers listed in display area 72 are provided namely for display lines 146, 147, 148, shown highlighted. The default display for map window 60 includes the current and next location for each field engineer but further details may optionally be displayed. In the example of FIG. 20, the preferred working locations for the three engineers are shown at 149, 150 and 151. Furthermore two of their PWAs are shown at 152 and 153.

It will be appreciated that the Find Task Engineers Query box in FIG. 20, when used for an unscheduled task, i.e. by clicking the mouse on an unscheduled task, provides details of engineers available to perform the task which can be displayed as shown in FIG. 12, as previously described.

Engineer Locations

Figure 22:
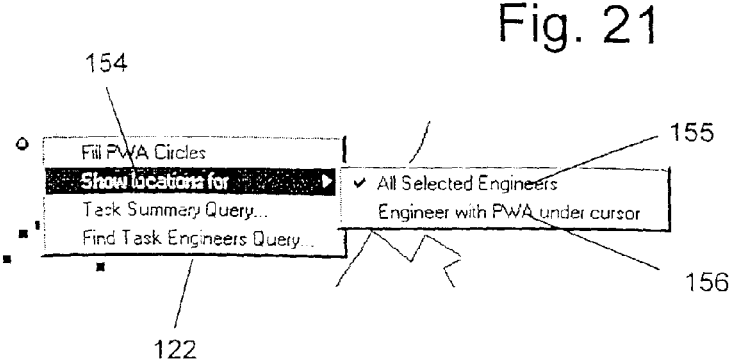
FIG. 22 illustrates a mouse-actuated drop down menu for selecting the PWAs of engineers, selected by means of the mouse.

As already described, only the locations of selected engineers displayed in the display area 72 of window 60 may be displayed on the map. Further control of which engineers are displayed can be achieved by clicking the right hand mouse button a blank area of the map to provide the drop down menu shown in FIG. 17, and then selecting a "show locations for" menu option 154 which offers two further options as shown in FIG. 22. When "all selected engineers" option 155 is selected, which is the default, the engineers' tasks are displayed as previously described with reference to FIG. 8. However, when option 156 is selected, then only the PWA circles for the selected PINs displayed in area 72 are shown, as before, but none of the task locations are displayed until the mouse pointer is placed over a particular PWA circle. Then the location of all types of tasks for that engineer are displayed irrespective of the map legend selections made in the map legend window shown in FIG. 10. This option is particularly useful for browsing through each relevant engineer to determine their location with respect to their PWA. It also reduces clutter when it is desired to see all types of locations for each engineer.

When this option is selected, moving the mouse pointer onto a PWA circle causes it to be displayed in bold and the start, current and preferred and, where appropriate, next location for that engineer only are then displayed on the map. If the PINs mobility limit is greater than the PWA radius, this is shown as a second circle in red, at an appropriate distance from the PINs current location. If the mobility distance is the same as the PWA radius, and the current location is also the preferred location then, on placing the mouse pointer on the PWA circle, the circle is again made bold, but now in red indicating that the two are superimposed.

Statistics Display

The workstation control software 25 includes a statistics generator 25c that can be selected by means of the statistics button 37 on the main window shown in FIG. 5. Displays produced by the statistics generator software 25c are shown in FIGS. 23 and 24. The software acts on a selected individual schedule e.g. schedule 41 in respect of the three successive days data therein, to provide totals and averages as shown in screen display 157, in FIG. 23. As shown in FIG. 24, the display also includes quality of service or QOS indicators, shown in screen 158. The statistical display software 25c also can provide graphical displays of the corresponding data (not shown).

Parameter Editor

Figure 25:
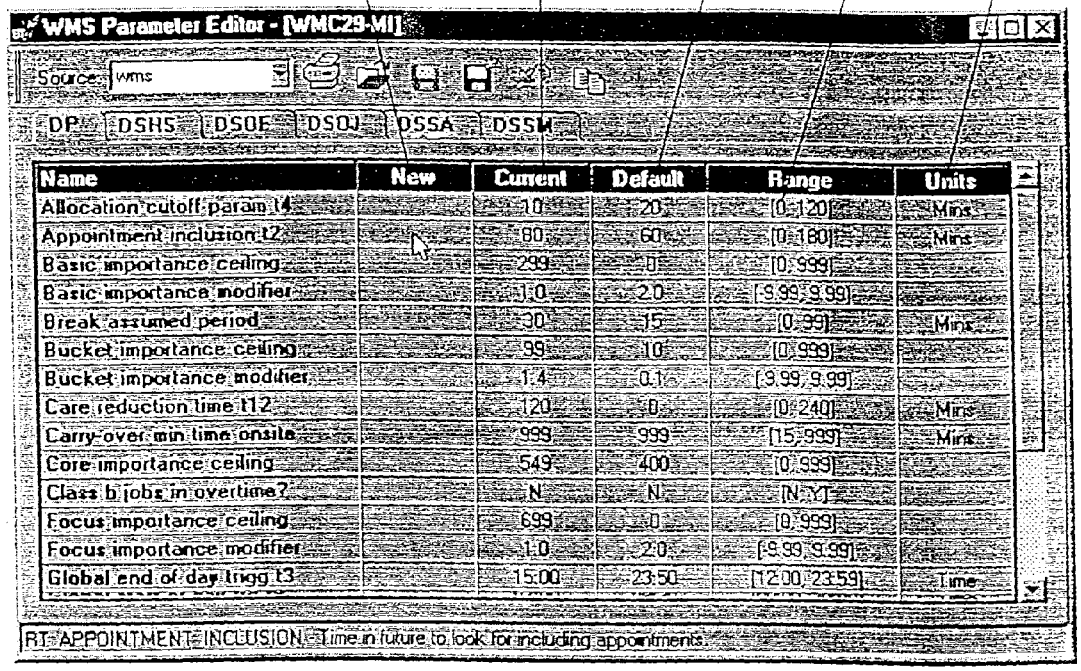
FIG. 25 illustrates a scheduler parameter editor window.

As previously described, the HS/SA scheduler 10 shown in FIG. 2 makes use of scheduling algorithms that include a number of adjustable parameters 15, which can be edited by means of parameter editor controller software 25e shown in FIG. 4. The parameter editor software is actuated by means of button 38 on button bar 33 of FIG. 5, as a result of which a display of the parameters is provided on output display 16 as shown in FIG. 25. A detailed discussion of the scheduler parameters is given in our PCT/WO98/22897 supra. In FIG. 25, the parameters are displayed over six pages and have been downloaded from the work manager server 5. Some of the workstations 7 will be provided with authority to chance the parameters for the scheduler 10 and to upload revised values of the individual parameters. This is achieved in FIG. 25 by placing new values of the parameters concerned in the "new" column 159, to replace the current values shown in column 160. Column 161 provides a default value for each individual parameter. A usual range is presented in column 162 and the units concerned in column 163.

The parameter editor can also be used to analyse the parameters for a particular set of schedule data 26 which, as previously described, may include scheduler parameter data 15, corresponding to the parameters actually used when preparing the schedule data by means of the scheduler 10. The parameter data derived from the schedule data 26 can also be edited, particularly for use in a what-if analysis. This is achieved by selecting one of the schedule data files, such as file 42 in the main window of FIG. 5, so as to display the scheduler parameter data from the selected file in the parameter editor.

What-if Analysis

As previously described, the scheduler 10 shown in FIG. 2 continually updates schedules and provides tasks to the individual engineers in response to task requests 9. The workstation 7 can carry out what-if analyses using the what-if server 12 shown in FIG. 2, making use of the scheduler 10, in parallel with the on-line scheduling process performed by scheduler 10 for the engineers in response to their task requests 9, i.e. during a period the scheduler is supplying schedule data to the engineers.

Figure 26:
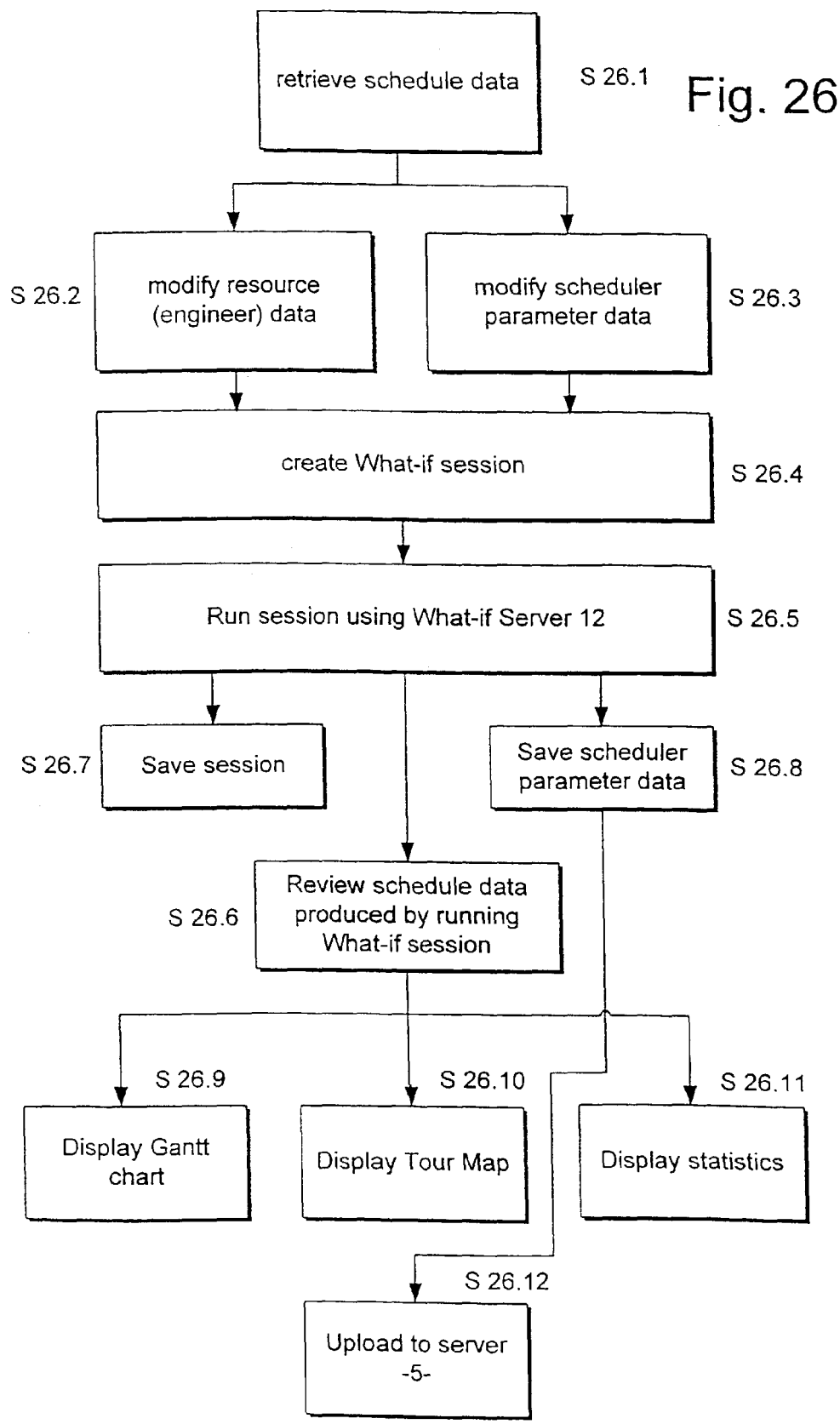
FIG. 26 is a block diagram of a what-if process for displaying the outcome of changes the schedule data.

FIG. 26 illustrates the overall process for a what-if enquiry. The what-if process allows schedule data 26 to be modified in respect of the resource data 6 concerning the engineers and the scheduler parameter data 15, previously used to prepare the schedule under investigation. Thus, the user can investigate what would happen if a different number of engineers were used with different working periods etc. and determine also the effect of changing the assumptions made in the scheduling process by the scheduler 10. The results can be compared with the original schedule data by use of the previously described Gantt chart, Tour Map and statistics display.

A what-if session is commenced by operating button 41 on button bar 33 in FIG. 5. The user then selects a schedule to be analysed. For example, one of the schedules 41–44 can be selected or an archived schedule can be chosen from one of the archive folders 36 shown in FIG. 5.

Figure 27:
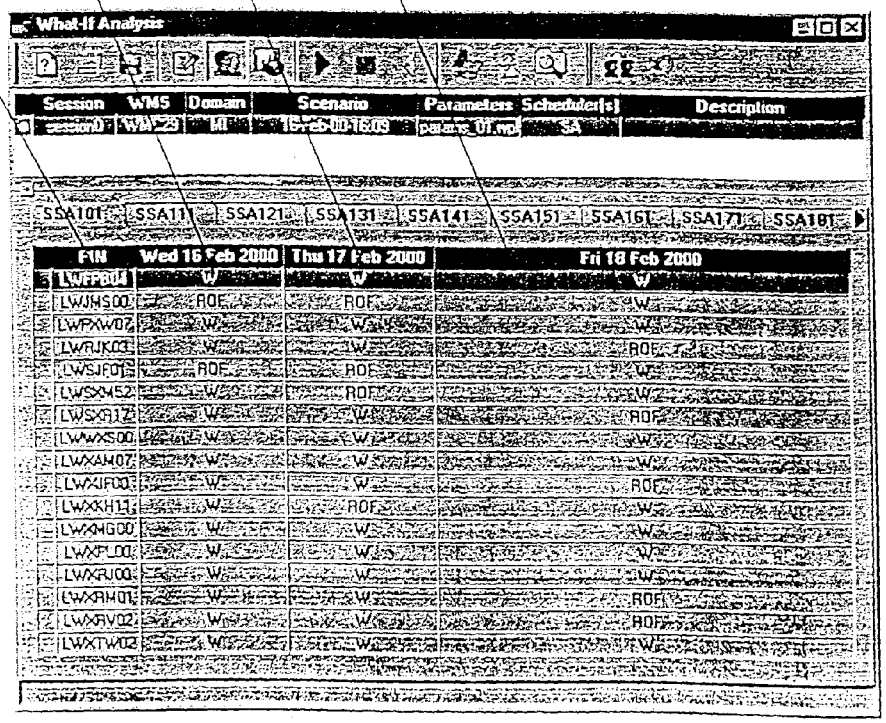
FIG. 27 illustrates an engineer resource editor window.

The retrieval of the schedule data is shown at step S26.1 in FIG. 26. Then, at step S26.2, the resource editor window shown in FIG. 27 is used to modify the engineer data 6 in the data schedule file retrieved at step S26.1. As previously described, the schedule data concerns engineers in a particular domain for three successive days. The OUCs for the domain are displayed on separate sheets and a display for OUC SSA 101 is shown in FIG. 21. The display includes a column 164 for the PINs of the engineers for the OUC together with details of their rostering information over three successive days, in column 165, 166 and 167. The codes W and ROF signify that the engineer concerned is working or rostered off. The operator at workstation 7 can selectively change this data. One or more engineers can be moved from the schedule. Engineers can be changed from "rostered off" to rostered on i.e. "working" and vice versa. Engineers' absences can be removed or added and one or more engineers can be duplicated to increase the resource available. These operations are performed using the mouse and keyboard.

At step S26.3, the scheduler parameter data 15 is selectively modified. This is carried out using the input screen shown in FIG. 25, as previously described. The changes made at step S26.2 and S26.3 thus set up a what-if session shown at step S26.4. It will be understood that in the what-if session, modifications have been made to a reference set of process conditions used in the scheduling process by the scheduler 10 to produce the schedule data file concerned, namely the scheduler parameter data 15 and the resource data 6. The what-if session sets up a modified set of these conditions. The what-if session is given a session number e.g. session 0. Further what-if sessions may be generated as previously described for comparison with one another.

Then at step S26.5, an individual what-if session is uploaded to the what-if server 12 in the work manager server 5 and, in parallel to the main processes, the scheduler 10 recalculates the schedule data using the updated parameters of the what-if session. The resulting schedule data is held as a what-if file 13 shown in FIG. 2 and then downloaded to the workstation 7 at step S26.6.

If desired, the session details can be individually stored at step S26.7. Also, the scheduler parameter data that was included in the session can be saved separately at step S26.8.

The amended schedule received at step S26.6 can then be reviewed. The schedule can be used to produce a Gantt chart on display 16 at step S26.9 in the manner previously described for the original schedule. The Gantt chart display can provide a display of both the original schedule and the schedule produced by the what-if session and so by displaying them side-by-side, a comparison of the changes can be easily made.

Similarly at step S26.10, a display Tour Map of the original schedule data and the result of the what-if session can be displayed, using the previously described Tour Map display.

A statistical display can also be produced as illustrated at step S26.11.

Figures 28, 29:
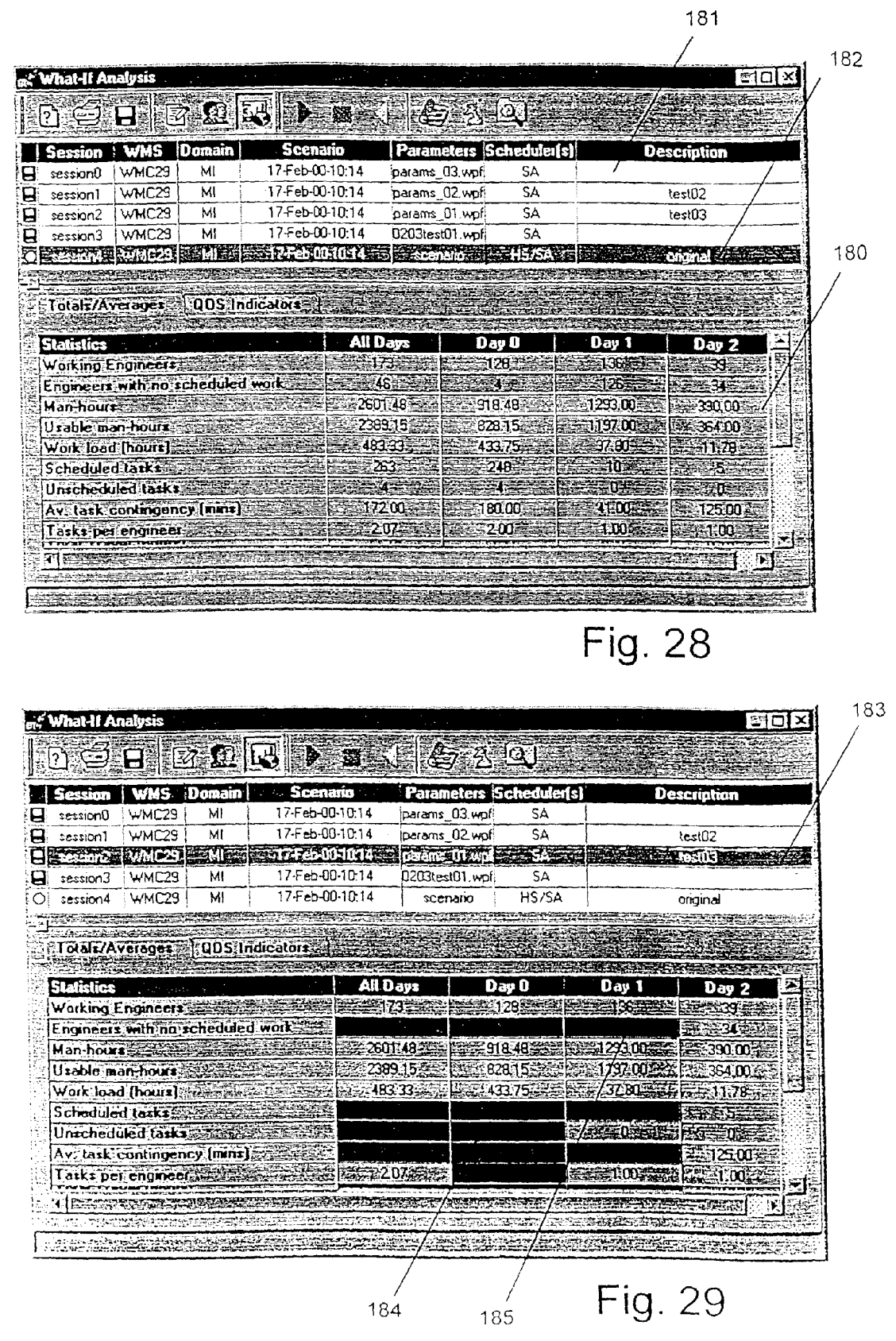

FIG. 28 illustrates a window for displaying what-if statistics. The window shown in FIG. 28 includes a main window area 180 which provides a statistical display generally similar to the display 157 shown in FIG. 23. In addition, a display window 181 is provided for the various sessions generated by step S26.4. In FIG. 28, one of the sessions, namely "session4" has been highlighted with the mouse, referenced 182. The corresponding totals/averages and QOS indicators are shown for "session4".

Then, as shown in FIG. 29, "session2" is highlighted, reference 183. As previously explained, the sessions are subject to changes with respect to one another and the corresponding changes in the statistics i.e. the changes between session 182 and 183, are highlighted, typically in red, as shown schematically at 184, 185 in the display. Thus a comparison between the various what-if sessions can be compared readily using this display.

If the parameter scheduler data saved at step S26.8 gives rise to an improved scheduling, as determined by the what-if analysis just described, the saved parameter data can be uploaded to the work manager server 5 to control operation of the scheduler 10 at step S26.12. In practice, the operator of the workstation 7 may by experience and also by what-if analysis, come to learn of different optimised sets of parameter scheduler data which work well for different conditions, such as at the beginning of the day, the end of the day, bad weather conditions, traffic congestion and other non-standard situations.

Also, the what-if analysis may provide insights into how the rostering and work patterns of engineers can be changed, which can be fed into engineer data 6 for the future, in order to improve and optimise the task scheduling.

Many modifications and variations to the described example of the invention are possible and, whilst the invention has been described in relation to a telecommunications system, it can be used to process tasks relating to other situations where resources need to be applied to carry out the tasks concerned. For example, other situations where field engineers are deployed. The invention could also be used for work scheduling in an industrial process situation. Many other applications will be evident to those skilled in the art.

What is claimed is:

1. A computer-implemented apparatus for scheduling tasks to be performed using a plurality of resources, comprising:

a first processing system arranged to generate schedule data comprising a plurality of schedules, each of the schedules comprising data indicative of tasks that individual ones of the resources are to carry out, prepared from task data concerning the tasks to be carried out and resource data concerning characteristics of resources available to carry out the tasks over a given period, said characteristics including location of the resource, wherein the first processing system is arranged to provide unscheduled task data concerning a task not included in the schedules, and to transmit the schedule data and the unscheduled task data to a second, different, processing system;

said second processing system being arranged to review the schedule data so as to identify at least one candidate resource to perform the unscheduled task corresponding to the unscheduled task data, wherein the second processing system is responsive to selection of said unscheduled task so as to identify two or more said candidate resources to perform the unscheduled task and to assign a ranking to each said candidate resources on the basis of the location the task and the location of the candidate resource, the second processing system being arranged to display data indicative of the identified two or more candidate resources.

2. The computer implemented apparatus according to claim 1 wherein the second processing system is arranged to compute the distance of the resources from the unscheduled task and to rank the candidate resources according to distance therefrom.

3. The computer implemented apparatus according to claim 1, wherein the second processing system is arranged to compute the time travel to the unscheduled task for the resources individually and to rank the candidate resources according to the computed travel time.

4. The computer implemented apparatus according to claim 1, wherein the second processing system is arranged to make an initial search for a group of resources to be considered as candidate resources on the basis of specified criteria.

5. The computer implemented apparatus according to claim 4, wherein the criteria include a resource skill level and the second processing system is arranged to identify those candidate resources having the specified skill level.

6. The computer implemented apparatus according to claim 4, wherein the second processing system is arranged to identify candidate resources to perform a plurality of unscheduled tasks, wherein said plurality of unscheduled tasks are to be performed at different locations in a geographical area by the resources, and the criteria include a preferred working area for each resource within the geographical area.

7. A computer-implemented method of scheduling tasks to be performed using a plurality of resources, the method comprising a first scheduling process and a second scheduling process:

the first scheduling process comprising:

generating schedule data comprising a plurality of schedules, each of the schedules comprising data indicative of tasks that individual ones of the resources are to carry out, prepared from task data concerning the tasks to be carried out and resource data concerning characteristics of resources available to carry out the tasks over a given period, said characteristics including location of the resources; and identifying unscheduled task data concerning a task not included in the schedules;

the second scheduling process comprising:

receiving the schedule data and the identified unscheduled task data;

selecting an unscheduled task from the unscheduled task data;

reviewing the schedule data so as to identify a plurality of candidate resources to perform the unscheduled task;

ranking the identified resources on the basis of the location of the task and the location of the candidate resource; and displaying data indicative of the identified two or more candidate resources.

8. A computer implemented method according to claim 7, including computing the distance of the candidate resources from the unscheduled task and ranking them according to distance therefrom.

9. A computer implemented method according to claim 7, including computing the time to travel to the unscheduled task for the candidate resources individually and ranking the candidate resources according to the computed travel time.

10. A computer implemented method according to claim 7, including making an initial search for a group of resources to be considered as candidate resources on the basis of specified criteria.

11. A computer implemented method according to claim 10, wherein the criteria include a candidate resource skill level and the search identifies those resources having the specified skill level.

12. A storage medium carrying computer readable code representing instructions for causing one or more computers to operate as the computer implemented apparatus according to claim 1.

13. A storage medium carrying computer readable code representing instructions for causing one or more computers to perform the computer implemented method according to claim 7 when the instructions are executed by the computer or computers.

* * * * *